(12) United States Patent
Ampunan et al.

(10) Patent No.: US 8,131,419 B2
(45) Date of Patent: Mar. 6, 2012

(54) WEB-ENABLED CONFIGURABLE QUALITY DATA COLLECTION TOOL

(75) Inventors: Nathan D. Ampunan, Novi, MI (US); Steven J. Ross, Livonia, MI (US); Jeffrey G. Ravas, Oxford, MI (US)

(73) Assignee: General Motors LLC, Detroit, MI (US)

( * ) Notice: Subject to any disclaimer, the term of this patent is extended or adjusted under 35 U.S.C. 154(b) by 56 days.

(21) Appl. No.: 11/964,147

(22) Filed: Dec. 26, 2007

(65) Prior Publication Data
US 2009/0037045 A1 Feb. 5, 2009

Related U.S. Application Data

(63) Continuation of application No. 10/949,787, filed on Sep. 24, 2004, now abandoned.

(60) Provisional application No. 60/509,606, filed on Oct. 8, 2003.

(51) Int. Cl.
*G06F 19/00* (2006.01)
*B60G 1/00* (2006.01)

(52) U.S. Cl. ............... 701/30; 701/36; 701/35

(58) Field of Classification Search ........ 701/24, 701/29–35, 104, 123, 36; 340/439, 450, 340/442; 702/184, 182
See application file for complete search history.

(56) References Cited

U.S. PATENT DOCUMENTS

| | | | |
|---|---|---|---|
| 6,609,051 B2 * | 8/2003 | Fiechter et al. | 701/33 |
| 6,928,348 B1 * | 8/2005 | Lightner et al. | 701/33 |
| 6,988,033 B1 * | 1/2006 | Lowrey et al. | 701/123 |
| 7,079,982 B2 * | 7/2006 | Ogura et al. | 702/185 |
| 7,133,804 B2 * | 11/2006 | Tonack et al. | 702/184 |
| 7,356,393 B1 * | 4/2008 | Schlatre et al. | 701/33 |
| 7,477,968 B1 * | 1/2009 | Lowrey et al. | 701/29 |
| 7,480,550 B2 * | 1/2009 | Huber et al. | 701/29 |
| 7,522,979 B2 * | 4/2009 | Pillar | 701/33 |
| 7,551,063 B2 * | 6/2009 | Inbarajan | 340/425.5 |
| 7,831,347 B2 * | 11/2010 | Oesterling | 701/33 |
| 7,908,051 B2 * | 3/2011 | Oesterling | 701/29 |
| 2006/0069475 A1 * | 3/2006 | Gutierrez et al. | 701/29 |

* cited by examiner

*Primary Examiner* — Ronnie Mancho
(74) *Attorney, Agent, or Firm* — Anthony L. Simon; Reising Ethington P.C.

(57) ABSTRACT

A method and system for configuring trigger parameters for captured test fleet vehicle data collection. The method includes selecting at least one vehicle identifier from a captured test fleet database, associating at least one trigger condition with the at least one selected vehicle identifier in the database, associating at least one vehicle parameter to be collected at an occurrence of the at least one associated trigger condition with the selected vehicle identifier in the database, and sending the at least one associated trigger condition and the at least one associated vehicle parameter from the database to a telematics unit of at least one test vehicle associated with the vehicle identifier via a wireless connection.

7 Claims, 11 Drawing Sheets

WEB-ENABLED CONFIGURABLE QUALITY DATA COLLECTION TOOL

CROSS-REFERENCE TO RELATED APPLICATIONS

This application is a continuation of U.S. Ser. No. 10/949,787 filed Sep. 24, 2004, which claims priority of U.S. Provisional Application Ser. No. 60/509,606 filed Oct. 8, 2003. The entirety of each application is hereby incorporated by reference.

FIELD OF THE INVENTION

The invention relates to vehicle design and manufacture, and more particularly to methods and systems for a web-enabled configurable quality data collection tool for a vehicle in a captured test fleet.

BACKGROUND OF THE INVENTION

Vehicle design and manufacture typically includes an iterative development process to refine vehicle design parameters with each successive design. Various techniques are employed in the development of a new vehicle, including the building and testing of pilot vehicles. A pilot vehicle is usually a limited manufacturing run of a reasonably mature or even pre-production vehicle design. The pilot vehicle is frequently field tested in order to further refine the final production vehicle prior to large scale manufacture. However, present vehicle manufacturing technologies also allow for the ongoing refinement of production vehicles through iterative development since automated manufacturing facilities operating just-in-time assembly processes typically do not require major retooling or down-time to accommodate design changes.

Field testing of a pilot or production vehicle typically involves operating the vehicle in a simulated or real-world driving environment, and collecting various vehicle system test and diagnostic data for later review and analysis. In a pilot vehicle, raw vehicle testing data is typically collected and stored in a field data collection apparatus while the vehicle is in operation. A diagnostic system is later plugged into the field data collection apparatus to download the raw testing data after the completion of the vehicle field testing. Several vehicle systems may be monitored during a vehicle field test, with the subsequent data stored to the data collection apparatus. However, the collected system data is limited to the data stored during the field operation, and the data is not available in real-time to a diagnostic system. For vehicle field tests performed with this system, a staff is required to run the field test, and to retrieve the test data from the collection apparatus. Each test vehicle must be individually downloaded of test data by a staff member plugging the data collection apparatus into a diagnostic system or a secondary data storage medium. It is therefore impractical to collect data from more than a nominal number of vehicles of a particular model during a fixed duration field test exercise. Additionally, while it is possible to integrate limited data collection components into a production vehicle, the test data may only be collected from a production vehicle each time the vehicle visits a facility where the test data may be downloaded; for example, an auto dealership. Moreover, an administrator trained specifically in how to read and decode the data must access the test data download. Furthermore, production vehicles having integrated data collection components will generally be limited in storage and processing power due to increased costs of providing the data collection components, and therefore the collection components may not have enough capacity to collect data for a meaningful period between downloads, or may experience a data overflow prior to collecting statistically useful data. Iterative vehicle design enhancement is then hindered by the inability to collect statistically relevant quantities of test data from a large number of vehicles of a selected model. The inability to monitor collected data in real-time, or on production vehicles further prevents an interactive design process across a large sample group.

It would be desirable therefore to provide a method and system for interactive vehicle design and manufacture that overcomes these and other disadvantages.

SUMMARY OF THE INVENTION

In accordance with one aspect of the invention, a method of configuring via the Internet trigger parameters for captured test fleet vehicle data collection describes selecting at least one vehicle identifier from a captured test fleet database, associating at least one trigger condition with the at least one selected vehicle identifier in the database, associating at least one vehicle parameter to be collected at an occurrence of the at least one associated trigger condition with the selected vehicle identifier in the database, and sending the at least one associated trigger condition and the at least one associated vehicle parameter from the database to a telematics unit of at least one test vehicle associated with the vehicle identifier via a wireless connection.

In accordance with another aspect of the invention, a computer readable medium includes computer readable code for selecting at least one vehicle identifier from a captured test fleet database, computer readable code for associating at least one trigger condition with the selected vehicle identifier in the database, computer readable code for associating at least one vehicle parameter to be collected at an occurrence of the at least one associated trigger condition with the selected vehicle identifier in the database, and computer readable code for sending the at least one associated trigger condition and the at least one associated vehicle parameter from the database to a telematics unit of at least one test vehicle associated with the vehicle identifier via a wireless connection.

In accordance with another aspect of the invention a system for configuring trigger parameters for captured test fleet vehicle data collection, includes means for selecting at least one vehicle identifier from a captured test fleet database, means for associating at least one trigger condition with the selected vehicle identifier in the database, means for associating at least one vehicle parameter to be collected at an occurrence of the at least one associated trigger condition with the selected vehicle identifier in the database, and means for sending the at least one associated trigger condition and the at least one associated vehicle parameter from the database to a telematics unit of at least one test vehicle associated with the vehicle identifier via a wireless connection.

DETAILED DESCRIPTION OF THE PRESENTLY PREFERRED EMBODIMENT

Figure 1:
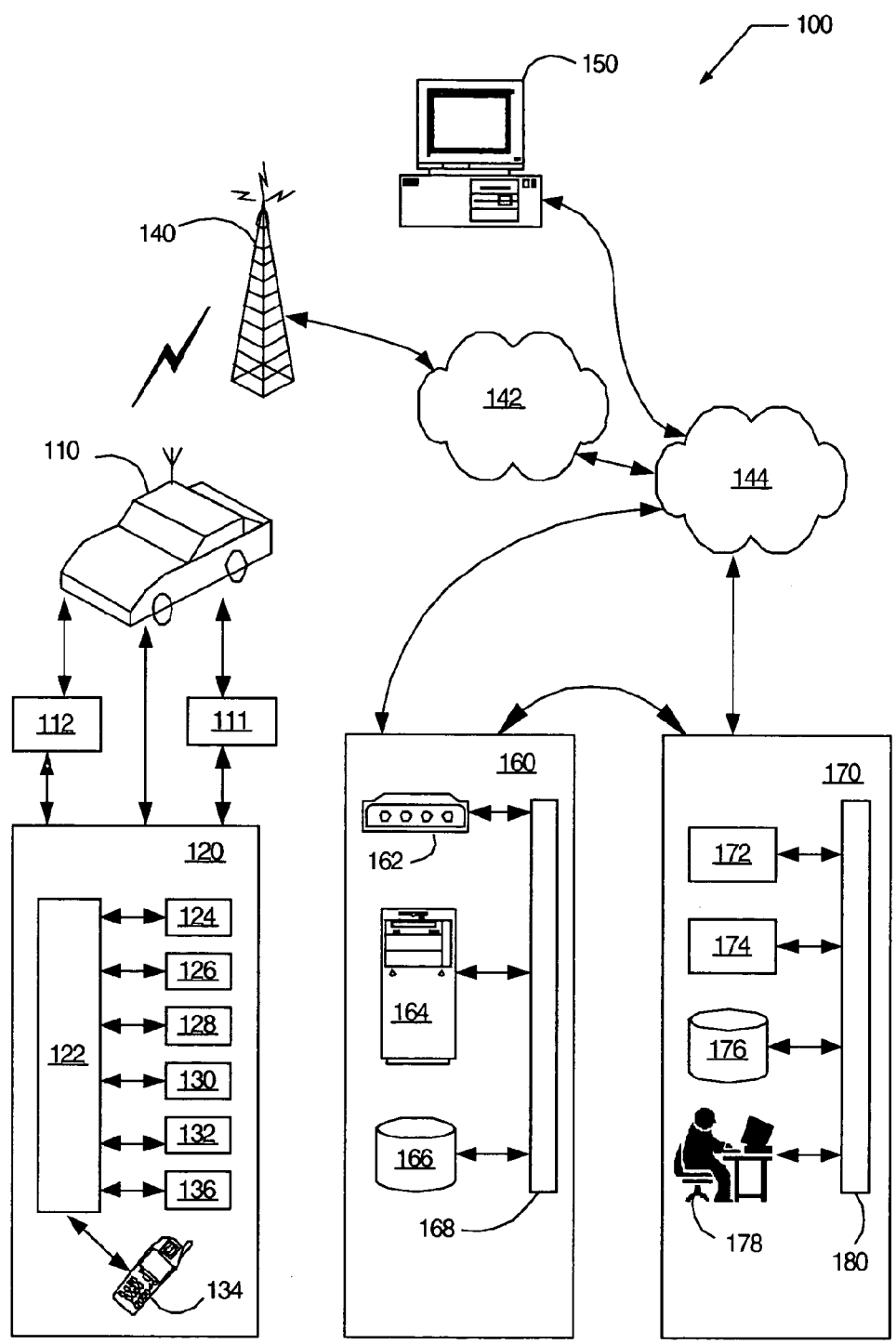
FIG. 1 is an illustrative operating environment for a captured test fleet in an embodiment of the present invention.

FIG. 1 is an illustrative operating environment for a captured test fleet in an embodiment of the present invention. In one embodiment, a captured test fleet is comprised of a set of identified vehicles monitored for vehicle or vehicle component behavior. FIG. 1 shows a captured test fleet vehicle communication system 100. Captured test fleet communication system 100 includes at least one captured test vehicle 110 (test vehicle, pilot vehicle, production vehicle) including vehicle communication bus 112 and telematics unit 120, one or more wireless carrier systems 140, one or more communication networks 142, one or more land networks 144, one or more client, personal or user computers 150, one or more web-hosting portals 160, and one or more call centers 170. In one embodiment, captured test vehicle 110 is implemented as a mobile vehicle equipped with suitable hardware and software for transmitting and receiving voice and data communications.

In one embodiment, telematics unit 120 is a vehicle communications unit that includes a processor 122 connected to a wireless modem 124, a global positioning system (GPS) unit 126, an in-vehicle memory 128, such as, for example, a non-volatile flash memory, a microphone 130, one or more speakers 132, an embedded or in-vehicle mobile phone 134, and a wireless access point node 136. Processor 122 is also referred to as a microcontroller, controller, host processor, or vehicle communications processor. GPS unit 126 provides longitude and latitude coordinates of the vehicle, as well as a time stamp. In-vehicle mobile telephone system 134 is a cellular-type phone, such as, for example an analog, digital, dual-mode, dual-band, multi-mode or multi-band cellular phone. In another example, the mobile telephone system is an analog mobile telephone system operating over a prescribed band nominally at 800 MHz. In another example, the mobile telephone system is a digital mobile telephone system operating over a prescribed band nominally at 800 MHz, 900 MHz, 1900 MHz, or any suitable band capable of carrying digital cellular communications.

Processor 122 executes various computer programs and communication control and protocol algorithms that control communication, programming, and operational modes of electronic and mechanical systems within test vehicle 110. In one embodiment, processor 122 is an embedded system controller. In another embodiment, processor 122 controls communications between telematics unit 120, wireless carrier system 140, and call center 170. In another embodiment, processor 122 controls communications between the wireless access point node 134 and nodes of a mobile ad hoc network. In one embodiment, a speech-recognition application is installed in processor 122 to translate human voice input through microphone 130 into digital signals. Processor 122 generates and accepts digital signals transmitted between telematics unit 120 and a vehicle communication bus 112 that is connected to various electronic modules in the vehicle 110. In one embodiment, the digital signals activate a programming mode and operation modes, as well as provide for data transfers. In another embodiment, a vehicle data upload (VDU) utility program facilitates the transfer of instructions and data requests to vehicle 110 and captured test fleet data.

Vehicle communication bus 112 sends signals to various units of equipment and systems within test vehicle 110 to perform various functions such as monitoring the operational state of vehicle systems, collecting and storing data from the vehicle systems, providing instructions, data and programs to various vehicle systems and calling from telematics unit 120. In facilitating interactions among the various communication and electronic modules, vehicle communication bus 112 utilizes bus interfaces such as controller-area network (CAN), J1850, International Organization for Standardization (ISO) Standard 9141, ISO Standard 11898 for high-speed applications, and ISO Standard 11519 for lower speed applications. Additionally, captured test vehicle 110, in one embodiment, sends and receives signals from a discrete I/O device 111 using discrete wiring.

Test vehicle 110, via telematics unit 120, sends and receives radio transmissions from wireless carrier system 140. Wireless carrier system 140 is implemented as any suitable system for transmitting a signal from mobile vehicle 110 to communication network 142. Wireless carrier system 140 incorporates any type of telecommunications in which electromagnetic waves carry signal over part of or the entire communication path. In one embodiment, wireless carrier system 140 transmits analog audio, digital audio (including, but not limited to, CDMA, TDMA, FDMA, GSM) and/or video signals. In an example, wireless carrier system 140 transmits analog audio and/or video signals such as those sent from AM and FM radio stations and transmitters, or digital audio signals in the S band (approved for use in the U.S.) and L band (used in Europe and Canada). In one embodiment, wireless carrier system 140 is a satellite broadcast system broadcasting over a spectrum in the "S" band (2.3 GHz) that has been allocated by the U.S. Federal Communications Commission (FCC) for nationwide broadcasting of satellite-based Digital Audio Radio Service (DARS).

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to mobile vehicle 110 and land network 144. In one example, wireless carrier system 140 includes a short message service, modeled after established protocols such as IS-637 SMS standards, IS-136 air interface standards for SMS, and GSM 03.40 and 09.02 standards. Similar to paging, an SMS communication could be broadcast to a number of regional recipients. In another example, the carrier system 140 uses services in accordance with other standards, such as, for example, IEEE 802.11 compliant wireless systems and Bluetooth compliant wireless systems.

Land network 144 is a public-switched telephone network (PSTN). In one embodiment, land network 144 is implemented as an Internet protocol (IP) network. In other embodiments, land network 144 is implemented as a wired network, an optical network, a fiber network, another wireless network, or any combination thereof. Land network 144 is connected to one or more landline telephones. Land network 144 connects communication network 142 to user computer 150, web-hosting portal 160, and call center 170. Communication network 142 and land network 144 connects wireless carrier system 140 to web-hosting portal 160 and call center 170.

Client, personal or user computer 150 includes a computer usable medium to execute Internet browser and Internet-access computer programs for sending and receiving data over land network 144 and optionally, wired or wireless communication networks 142 to web-hosting portal 160 and test vehicle 110. Personal or user computer 150 sends captured test fleet data requests to web-hosting portal through a web-page interface using communication standards such as hypertext transport protocol (HTTP), and transport-control protocol Internet protocol (TCP/IP). In one embodiment, the data includes directives to change certain programming and operational modes of electronic and mechanical systems within test vehicle 110. In another embodiment, the data includes directives to send certain data such as operational modes of electronic and mechanical systems within test vehicle 110. In operation, a user, such as, for example, a vehicle designer or manufacturing engineer, utilizes user computer 150 to access real-time test fleet data from test vehicle 110 that is cached or stored in web-hosting portal 160. Captured test fleet data from client-side software is transmitted to server-side software of web-hosting portal 160. In one embodiment, captured test fleet data is stored at web-hosting portal 160. In another embodiment, client computer 150 includes a database (not shown) for storing received captured fleet data. In yet another embodiment, a private Local Area Network (LAN) is implemented for client computer 150 and Web hosting portal 160, such that web hosting portal is operated as a Virtual Private Network (VPN).

Web-hosting portal 160 includes one or more data modems 162, one or more web servers 164, one or more databases 166, and a network 168. In one embodiment, web-hosting portal 160 is connected directly by wire to call center 170, or connected by phone lines to land network 144, which is connected to call center 170. In another embodiment, web-hosting portal 160 is connected to call center 170 without a direct wire connection, but with a connection allowing communication between the call center 170 and the web-hosting portal 160. Web-hosting portal 160 is connected to land network 144 by one or more data modems 162. Land network 144 sends digital data to and from modem 162; data that is subsequently transferred to web server 164. In one implementation, modem 162 resides inside web server 164. Land network 144 transmits data communications between web-hosting portal 160 and call center 170.

Web server 164 receives various data requests or instructions from user computer 150 via land network 144. In alternative embodiments, user computer 150 includes a wireless modem to send data to web-hosting portal 160 through a wireless communication network 142 and a land network 144. Data is received by modem 162 and sent to one or more web servers 164. In one embodiment, web server 164 is implemented as any suitable hardware and software capable of providing web services to transmit and receive data from user computer 150 to telematics unit 120 in test vehicle 110. Web server 164 sends to or receives data transmissions from one or more databases 166 via network 168. Web server 164 includes computer applications and files for managing captured test fleet data.

In one embodiment, one or more web servers 164 are networked via network 168 to distribute captured test fleet data among its network components such as database 166. In an example, database 166 is a part of or a separate computer from web server 164. In one embodiment, web-server 164 sends data transmissions with captured test fleet data to call center 170 via modem 162, and through land network 144.

Call center 170 is a location where many calls are received and serviced at the same time, or where many calls are sent at the same time. In one embodiment, the call center is a telematics call center, facilitating communications to and from telematics unit 120 in test vehicle 110. In an example, the call center is a voice call center, providing verbal communications between an advisor in the call center and a subscriber in a mobile vehicle. In another example, the call center contains each of these functions. In other embodiments, call center 170 and web-hosting portal 160 are located in the same or different facilities.

Call center 170 contains one or more voice and data switches 172, one or more communication services managers 174, one or more communication services databases 176, one or more communication services advisors 178, and one or more bus systems 180.

Switch 172 of call center 170 connects to land network 144. Switch 172 transmits voice or data transmissions from call center 170, and receives voice or data transmissions from telematics unit 120 in mobile vehicle 110 through wireless carrier system 140 and/or wireless access point node 136, communication network 142, and land network 144. Switch 172 receives data transmissions from, and sends data transmissions to, one or more web-hosting portals 160. Switch 172 receives data transmissions from, or sends data transmissions to, one or more communication services managers 174 via one or more bus systems 180.

Communication services manager 174 is any suitable hardware and software capable of providing communication services to telematics unit 120 in mobile vehicle 110. Communication services manager 174 sends to or receives data transmissions from one or more communication services databases 176 via bus system 180. Communication services manager 174 sends to or receives data transmissions from one or more communication services advisors 178 via bus system 180. Communication services database 176 sends to or receives data transmissions from communication services advisor 178 via bus system 180. Communication services advisor 178 receives from or sends to switch 172 voice or data transmissions.

Communication services manager 174 facilitates one or more services, such as, but not limited to, enrollment services, navigation assistance, directory assistance, roadside assistance, business or residential assistance, information services assistance, emergency assistance, and communications assistance and vehicle data management services. Communication services manager 174 receives service requests for captured test fleet data from a user via user computer 150, web-hosting portal 160, and land network 144. Communication services manager 174 transmits and receives operational status, instructions and other types of vehicle data to telematics unit 120 in test vehicle 110 through wireless carrier system 140, communication network 142, land network 144, wireless access point node 136 voice and data switch 172, and bus system 180. Communication services manager 174 stores or retrieves vehicle data and information from communication services database 176. Communication services manager 174 provides requested information to communication services advisor 178.

In one embodiment, communication services advisor 178 is a real advisor. In another embodiment, communication services advisor 178 is implemented as a virtual advisor. In an example, a real advisor is a human being at service provider service center in verbal communication with service subscriber in mobile vehicle 110 via telematics unit 120. In another example, a virtual advisor is implemented as a synthesized voice interface responding to requests from telematics unit 120 in mobile vehicle 110.

Communication services advisor 178 provides services to telematics unit 120 in mobile vehicle 110. Services provided by communication services advisor 178 include enrollment services, navigation assistance, real-time traffic advisories, directory assistance, roadside assistance, business or residential assistance, information services assistance, emergency assistance, and communications assistance. Communication services advisor 178 communicates with telematics unit 120 in mobile vehicle 110 through wireless carrier system 140, communication network 142, and land network 144 using voice transmissions, or through communication services manager 174 and switch 172 using data transmissions. Switch 172 selects between voice transmissions and data transmissions.

Test vehicle 110 initiates service requests to call center 170 by sending a voice or digital-signal command to telematics unit 120 which in turn, sends an instructional signal or a voice call through wireless modem 124, wireless carrier system 140, communication network 142, and land network 144 to call center 170. In another embodiment, the service request is for a vehicle data upload (VDU) that initiates a data transfer between test vehicle 110 and service center 170 or web hosting portal 160. In another embodiment, the mobile vehicle 110 receives a request from call center 170 to send various vehicle data from mobile vehicle 110 through telematics unit 120 through wireless modem 124, wireless access point node 136, wireless carrier system 140, communication network 142, and land network 144 to call center 170. In one embodiment, one or more triggers stored in the telematics unit 120 cause the test vehicle to initiate a service request. A trigger is an event with associated data that interacts with a set of parameter retrieval definitions. A trigger is, for example, a number of ignition cycles, a specific time and date, an expired time, a number of kilometers, a request for continuous operation and the like.

A vehicle configuration is a collection of vehicles, triggers, parameter retrieval definitions, and parameters. Triggers cause parameter retrieval definitions to be examined and executed. Parameter retrieval definitions identify specific parameters to be collected on a vehicle and communicated to a remote facility, such as a call center, where the parameters are parsed and analyzed. Parameter retrieval definitions are dependent on module hardware and software revisions resident within vehicles. Parameters contain the specific data requested by the parameter retrieval definitions. The parameter retrieval definitions contain the criteria to retrieve specific data embodied within parameters.

Parameter retrieval definitions are examined in response to activation of a trigger. For example, the parameter retrieval definitions are contained in a table or an array and are sequentially index through by an application program. Parameter retrieval definitions may contain, for example, criteria for retrieving oil life information or odometer information.

Triggers are initially programmed into or downloaded into telematics unit 120. An application program resident in telematics unit 120 examines the conditions specified to generate an event specified by the trigger. For example, if the trigger resident in the telematics unit specifies a request for an event at 2800 miles, then the odometer or other mileage measuring device in the vehicle is examined on a polled or event driven basis and when the mileage measuring device indicates a mileage of 2800 miles, an event is generated. This event is typically, for example, a phone call generated by the telematics unit into a telematics call center.

Once the event manifested as a phone call into the telematics call center is established at the call center, the parameter retrieval definitions for that vehicle that initiated the call are examined. Each parameter retrieval definition is subsequently formatted and communicated to the calling vehicle. The calling vehicle examines and acts on the received parameter retrieval definitions. For example, a parameter retrieval definition may define a request for oil life information. Oil life information is subsequently collected, formatted, and communicated to the call center. As another example, a parameter retrieval definition requests an odometer reading. Odometer information is collected, formatted, and communicated to the call center. The data is collected in a database at the call center and is maintained and analyzed at the call center, wherein the data is transient at the telematics unit. In one embodiment, the data may be maintained and analyzed at the telematics unit.

Figure 2:
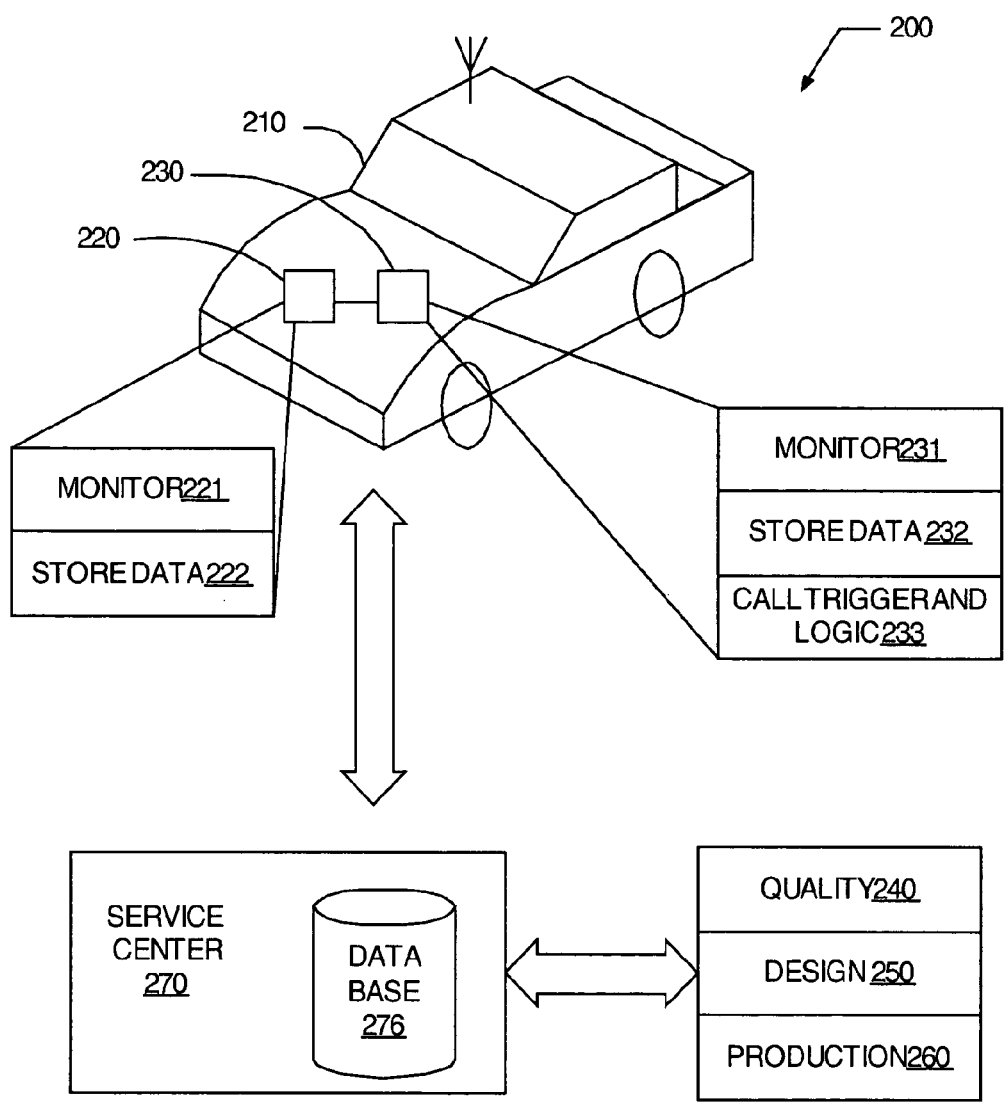
FIG. 2 is a block diagram of an illustrative operating environment for interactive vehicle design in accordance with an embodiment of the present invention.

FIG. 2 is a block diagram of an illustrative operating environment for interactive vehicle design in accordance with an embodiment of the present invention. FIG. 2 shows captured test fleet system 200 including a test fleet vehicle 210 having at least one vehicle system module 220 and a vehicle telematics unit 230. A service center 270 is shown in communication with the captured test fleet vehicle 210. The service center is shown including a database 276. The vehicle system module 220 is shown including executable command programs to monitor 221 and store data 222 of a vehicle system. The vehicle telematics unit 230 is shown including executable command programs to monitor 231 and store data 232 of a vehicle system, and executable programs and triggers 233 for initiating communication with the service center 270. The service center 270 is shown in communication with clients for quality assurance 240, design 250 and production 260.

Test vehicle 210 is any vehicle, such as, for example a pilot vehicle, that is operated within a captured test fleet of vehicles enabled for test fleet data communication through a telematics service provider. The captured test fleet includes a plurality of test vehicles of similar and different vehicle models that are enabled to communicate with a service center to allow real-time and cached field monitoring of vehicle design and operational parameters in the test vehicles. In one embodiment, a captured test fleet includes approximately fifteen to twenty thousand selected vehicles. In another embodiment, the captured test fleet comprises less than 50 selected test vehicles. The captured test fleet system 200 is configurable for operation with any number of test vehicles depending on the data desired and the purpose of the data collection, such as for development, design and manufacturing exercises.

Telematics unit 230 is, for example, telematics unit 120 discussed with reference to FIG. 1, or any telematics unit configured to allow the services described in this example.

Vehicle system module 220 is any device, such as, but not limited to, a power train control module (PCM) that is designed to monitor a system of vehicle 210. The vehicle control module is enabled to receive data communications and instructions from other devices, such as for example, telematics unit 230 through a vehicle communications bus. In an example, other types of vehicle system modules include modules for brake and steering control, modules for monitoring catalytic conversion, suspension control modules and the like. In an embodiment, vehicle control modules detect and/or generate diagnostic trouble codes (DTC).

Service center 270 is, for example, a service provider center such as described with reference to call center 170 of FIG. 1, or a service provider center configured to provide the services described in this example. In one embodiment, service center 270 is implemented as a web-server as described with reference to web-server 160 of FIG. 1.

Database 276 is any database for storing captured test fleet data. In one embodiment, database 276 is a relational database having unique data entries for each test vehicle operated within a captured test fleet. Each unique vehicle entry of the database 276 is associated with a test fleet identifier that identifies the vehicle and defines the vehicle as a captured test fleet member. In one embodiment, a test fleet identifier is a vehicle identification number (VIN). In another embodiment, a test fleet identifier is an electronic serial number (ESN) of a telematics device, a system identification (SID) number of a telematics device, or mobile identification number (MIN) assigned to a telematics device. In one embodiment, the database 276 includes relational associations to provide correlated captured test fleet data for statistical analysis, such as similar vehicle system information from a plurality of test vehicles 210.

A client is any entity or computing device that interacts with captured test vehicle data, such as a vehicle design center, an engineering team or a manufacturing production group where a client 150 such as described with reference to FIG. 1 is used to facilitate receiving and process the captured test fleet data. In one embodiment, the client is a computer or server system that manages captured test fleet data and provides analysis to users. In another embodiment, the client is a user or group of users that access captured test fleet data through a web-portal, a service center 270 or another data communicating regime. Quality assurance client 240 is any client that manages quality assurance for a vehicle manufacturing process. Design client 250 is any client that manages vehicle design for a vehicle manufacturing process. Production client 260 is any client that manages vehicle production for a vehicle manufacturing process.

In operation, the captured test fleet system operates a plurality of telematics enabled test vehicles 210 that communicate test data to the service center 270 in a virtual private network (VPN) to provide real-time and cached vehicle test data for vehicle prototyping, design, development and manufacture. A test fleet identifier stored in database 276 and test vehicle 210 identifies a test vehicle as a member of a test fleet that has private communication privileges with service center 270 and clients. Service center 270 provides captured test fleet data warehousing and caching for various test data collected from test vehicle 210 and vehicle system module 220 while operating under field test conditions. In one embodiment, service center 270 is enabled to request data from test vehicle 210, or to relay a data request from a client to one or more test vehicles 210. In another embodiment, test vehicle 210 is enabled to provide periodic or continuous data transfers to service center 270 or to a client through serviced center 270. An interactive wireless real-time vehicle design and manufacturing process is enabled through the use of captured test fleet system 200 when a test vehicle 210 is directed to monitor specific vehicle and vehicle system parameters by a service center or client.

Figure 3:
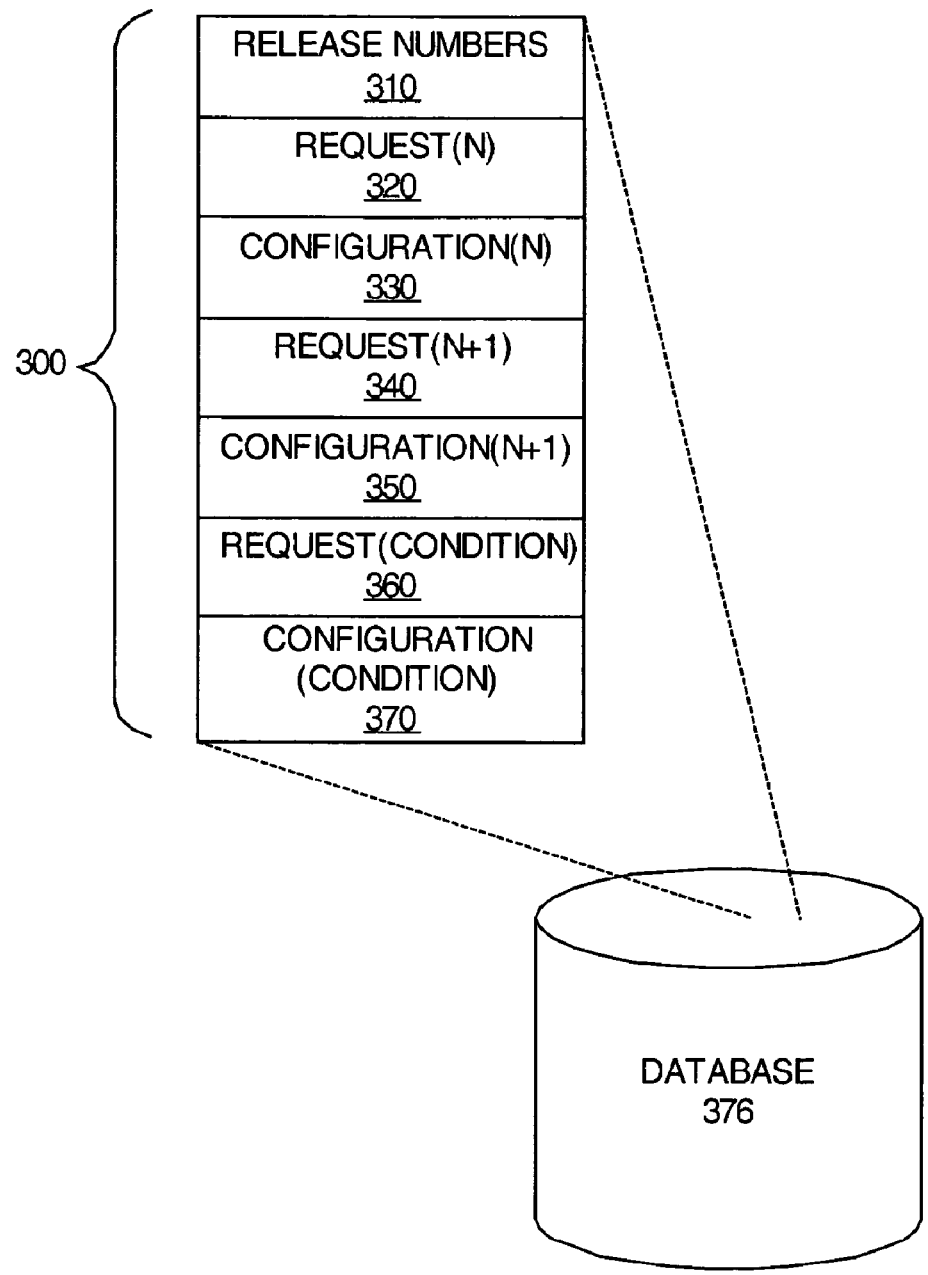
FIG. 3 is a block diagram of a captured test fleet database in accordance with an embodiment of the present invention.

FIG. 3 is block diagram of a captured test fleet database in accordance with an embodiment of the present invention. In one embodiment, database 376 is a relational database having captured test fleet data records associated with test vehicle operated in a captured test fleet.

Database 376 includes one or more captured test vehicle data entries corresponding to test vehicles operated in a captured test fleet system as described with reference to FIG. 2. In the embodiment shown in FIG. 3, a captured test fleet database entry 300 includes test vehicle data components such as a release number records 310, sequential data request records 320, 340, 360 and configuration data records 330, 350 and 370. Each test data component is available as an individual record that may be manipulated for statistical or other analysis. In one embodiment, data request records identify sequential data requests, such as, for example record number N and the next sequential record number N+1, sent to a specific test vehicle associated with a test fleet identifier. In another embodiment, data request records identify specific data requests sent to a plurality of test vehicles associated with a test fleet identifier. In an embodiment, configuration data records identify sequential configuration data, such as, for example record number N and the next sequential record number N+1, received from a specific test vehicle associated with a test fleet identifier. In still another embodiment, configuration data records identify vehicle test data collected from a plurality of test vehicles of a captured test fleet. In an example, a configuration data record describes the monitoring configuration of one or more vehicle systems in a specific test vehicle of the captured test fleet. In another embodiment, additional data records (not shown) are stored in database 376 that are associated with captured test fleet vehicles. In an embodiment, database 376 contains any type of captured test fleet data obtained from a test fleet vehicle that is usable by a client for vehicle design, manufacture and quality assurance.

Figure 4:
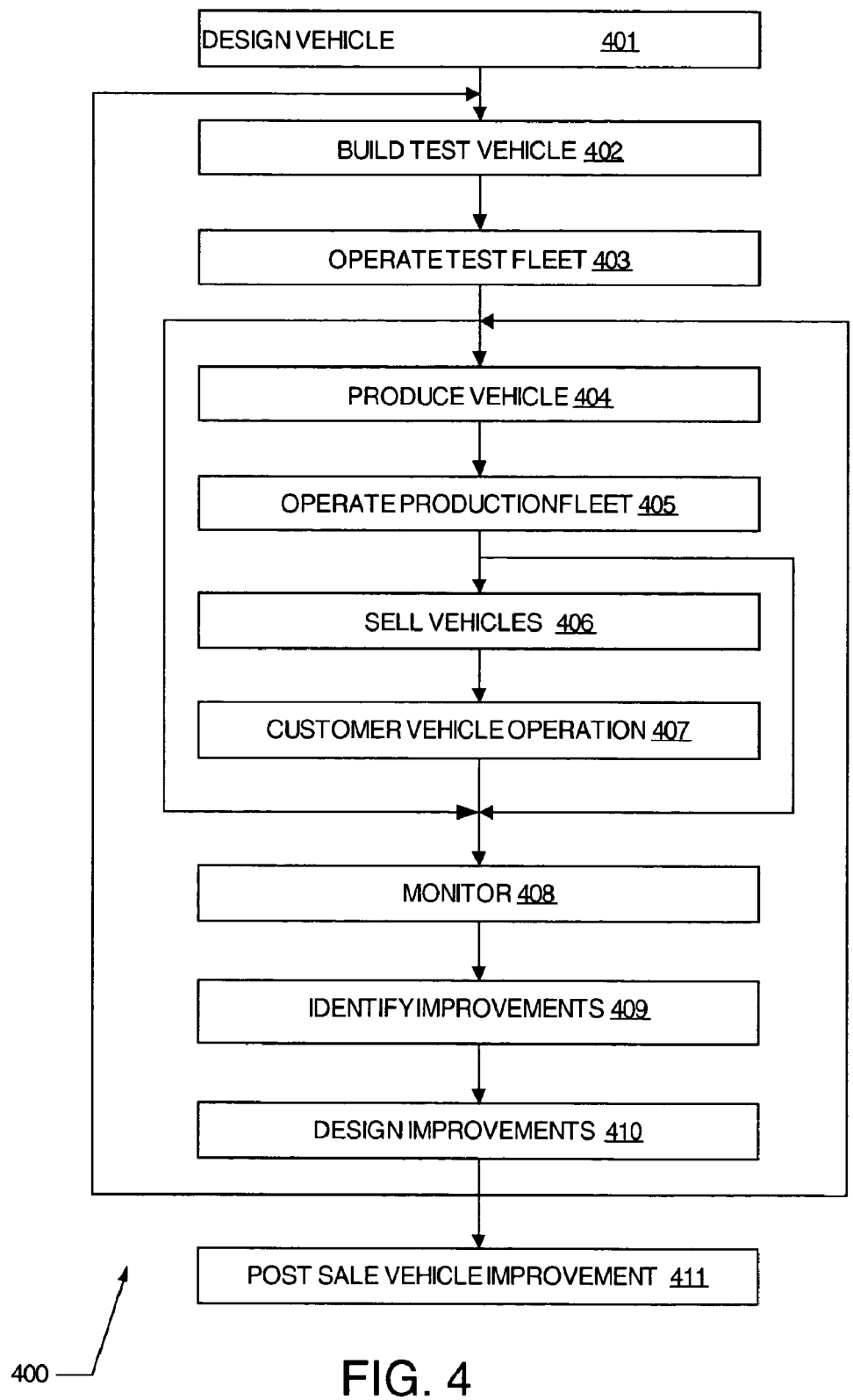
FIG. 4 is a process flow diagram of a method for interactive design and manufacture of a vehicle in accordance with an embodiment of the present invention.

FIG. 4 is a process flow diagram of a method for interactive design and manufacture of a vehicle in accordance with an embodiment of the present invention. In an embodiment, a captured test fleet vehicle communication system 100 is employed with certain steps of process 400. Process 400 begins in step 401.

In step 401, a vehicle is designed. An initial vehicle design forms the basis for the interactive design and manufacturing process 400. Designing an initial vehicle commences the design and manufacture process 400. Conventional vehicle design techniques are well known in the art and therefore will not be further discussed.

In step 402, a test vehicle is built. The test vehicle is built at any time after a vehicle is designed or an initial design is improved. One or more test vehicles are built in step 402. In one example, the test vehicles are production intent prototypes.

In step 403, a captured test fleet is operated. The captured test fleet is operated at any time after a test vehicle is built and enabled for communication with a service provider in a captured test fleet. Operating a captured test fleet includes monitoring and collecting data from test fleet vehicles systems, storing the collected data, providing the data to a production design team for analysis and iterative design refinement, and then altering initial vehicle design based on the analysis and design refinement. Various collected vehicle system data is communicated from a test vehicle having a telematics unit 120 through a service provider in a virtual private network comprised of one or more test vehicles, a service provider and a design center client. In one embodiment, requests for vehicle data are sent from a client, and a vehicle responds to the data request by sending the requested data to the client through a service provider. In another embodiment, a test vehicle is configured to automatically provide vehicle system data to a service center based on trigger events, such as, for example, a specific time, an expired amount of time, a number of ignition cycles and the like.

In step 404, a vehicle is produced. Producing a vehicle includes small and large scale manufacturing of a designed production vehicle.

In step 405, a production fleet is operated. The production test fleet is operated at any time after a production vehicle is produced and enabled for communication with a service provider. The production fleet is operated between the manufacture and sale of a production vehicle, such as, for example, during a launch period, or a dealership test driving program.

In step 406, vehicles are sold to consumers. The vehicle is sold to a consumer at any time after vehicle production and delivery to a sale location, such as an auto dealership, for example.

In step 407, a customer operates a purchased vehicle. A vehicle is operated by a consumer at any time after the vehicle is purchased.

In step 408, production vehicles are monitored. In one embodiment, production vehicles are monitored at any time after a consumer begins operating a production vehicle. The monitoring comprises monitoring and collecting data from production vehicle systems, storing the collected data, providing the data to a production design team for analysis and iterative design refinement. Various collected production vehicle system data is communicated from a production vehicle having a telematics unit 120, 230 through a service provider in a virtual private network comprised of one or more production vehicles, a service provider and a design or quality assurance client. In one embodiment, requests for vehicle data are sent from a client, and a vehicle responds to the data request by sending the requested data to the client through a service provider. In another embodiment, a test vehicle is configured to automatically provide vehicle system data to a service center based on trigger events, such as, for example, a specific time, an expired amount of time, a number of ignition cycles and the like. In another embodiment, step 408 is performed on test vehicles.

In step 409, improvements are identified. Improvements in production vehicle design are identified through analysis of production vehicle system data collected in the step of monitoring 408.

In step 410, vehicle improvements are designed based on the identified improvements. The vehicle improvements are designed at any time after the collected vehicle data is analyzed and design improvements are identified. The improved design is then provided to vehicle manufacturing facilities, a dealership or vehicle service center and the like.

In step 411, vehicles are improved post sale. A vehicle is improved at anytime after a production vehicle design is improved. In one embodiment, a vehicle is improved after sale through an upgrade service at an auto dealership. In an example, a production vehicle is improved at an auto dealership by downloading improved software and/or installing new hardware.

In other embodiments of the invention, additional methods for vehicle design and manufacture are described. In one embodiment, a method of vehicle manufacture comprises designing a vehicle, building at least one pilot vehicle of the designed vehicle, installing a telematics units 120, 130 in each of the pilot vehicles, configuring the telematics unit 120, 230 to monitor systems of the pilot vehicle during vehicle operation, operating the pilot vehicle in a captured test fleet, obtaining data from the telematics unit 120, 230 during the operating in a captured test fleet, altering vehicle design data in response to the obtained data and, building a production vehicle with the design influenced by the altered vehicle design data.

In one embodiment, the captured test fleet comprises at least one pilot vehicle having a unique identification and wherein each at least one vehicle has an associated captured test fleet identifier stored in a relational database.

In another embodiment, obtaining data from the telematics unit 120, 230 includes receiving a request for captured test fleet data, determining vehicles having captured test fleet identifiers corresponding to the request, sending a data retrieval request to vehicles based on the determination, and receiving data from the vehicles responsive to the data retrieval request.

In still another embodiment, altering vehicle design data in response to the obtained data includes providing the obtained data to a vehicle design center, analyzing the obtained data at the vehicle design center, identifying a modification to the designed vehicle to improve the designed vehicle based on the obtained data, and providing new vehicle design data based on the identified modification. In another embodiment, new vehicle design data comprises improved vehicle component design data.

Another method of vehicle manufacture describes designing at least one vehicle, building at least one pilot vehicle of the at least one designed vehicle, installing telematics units 120, 230 in the at least one pilot vehicle, operating the at least one pilot vehicle in a test fleet; for each pilot vehicle of the test fleet, monitoring performance of at least one vehicle system within the pilot vehicle, first storing data within a controller in the pilot vehicle in response to the monitoring, automatically triggering within the telematics unit 120, 230 a telematics connection from the pilot vehicle to a service center wherein the telematics connection is triggered independent of a location of the pilot vehicle, communicating the first stored data to the service center; second storing the first stored data in the service center, providing the second stored data to at least one person capable of influencing design of the at least one vehicle and the at least one vehicle system and modifying at least one vehicle system or component of the designed vehicle in response to the second stored data.

In an embodiment, automatically triggering within the telematics unit 120, 230 a telematics connection from the pilot vehicle to a service center includes determining an upload trigger occurrence.

In another embodiment, the upload trigger is selected from the group consisting of a count of ignition cycles, expired days, kilometers recorded, a specific time, a continuous upload request and a user initiated call request.

In yet another embodiment, storing the first stored data in the service center includes associating the first stored data with an entry in a relational database based on a test fleet identifier, the database having a unique entry corresponding to each at least one pilot vehicle of the test fleet, and storing the first stored data to the unique entry corresponding to the pilot vehicle that communicated the data to the service center.

Figure 5:
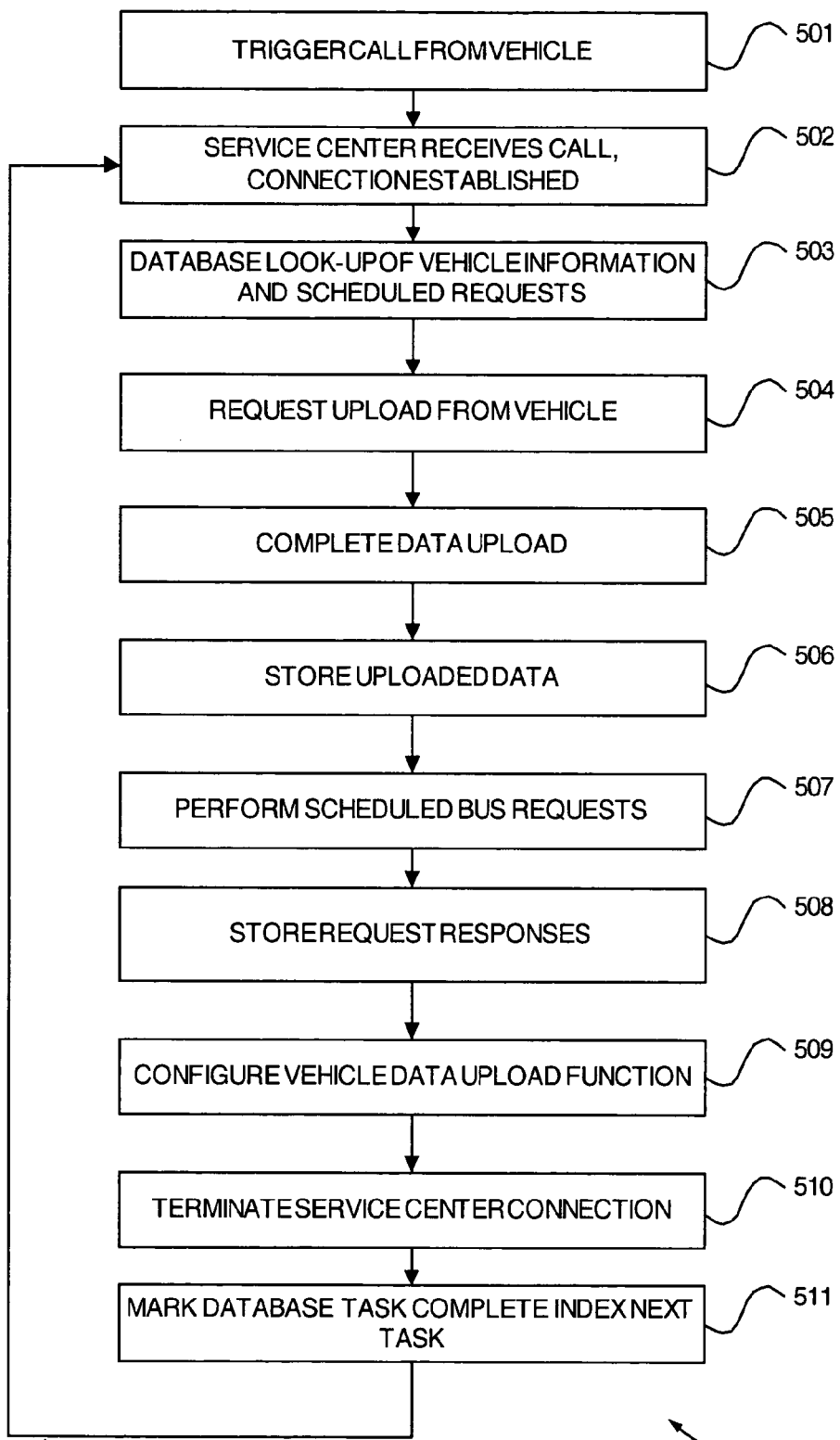
FIG. 5 is a process flow diagram of a method for providing captured test fleet data from a test vehicle in accordance with an embodiment of the present invention.

FIG. 5 is a process flow diagram of a method for providing captured test fleet data from a test vehicle in accordance with an embodiment of the present invention. In an embodiment, a captured test fleet vehicle communication system 100 is used to implement the method of process 500. Process 500 begins in step 501.

In step 501 a call is triggered from a vehicle. The call is triggered based on a detected condition such as a specified number of ignition cycles, expired number of days, kilometers recorded, a specific time, a continuous upload request and a user initiated call request, that is programmed into a telematics device in a vehicle. The call is triggered any time a triggering condition is detected at the vehicle. In another embodiment, a user initiates a call via an utterance or button press.

In step 502, a test service center receives the call and a connection is established with a vehicle. A service provider relays a wireless carrier communication request from the vehicle to the service center. The service center answers the request and establishes a connection. The connection is enabled at any time after the call center receives the request, and before termination of the connection.

In step 503, vehicle information and scheduled requests are looked up in a database. A database, such as database 376 of FIG. 3 for example, contains database entries 300 having records of vehicle data such as information and scheduled requests. The database entries are accessed at any time after the call is connected.

In step 504, an upload is requested from a vehicle. A vehicle data upload (VDU) directs data to be either transferred from a vehicle to a service center or, as in the present embodiment, from a service center to a vehicle through the connected call or another communication channel. The VDU request occurs at any time after the call from the vehicle is connected to the call center.

In step 505, the data upload is completed. The vehicle data upload transfers data requests, instructions and other data to the vehicle from the service center.

In step 506, the data upload is stored. Memory 128 in the vehicle stores the data transferred to the vehicle in the VDU.

In step 507, scheduled bus requests are performed. In one embodiment, contents of the vehicle data upload stored to memory include vehicle bus requests that specify systems and modules of the vehicle that are accessed via a vehicle communication bus 112. A bus request is any data request that is communicated to a system or module of a vehicle over a vehicle communication bus 112. In an embodiment, a schedule of data requests is included in a vehicle data upload such that data requests are distributed to vehicle systems based on the schedule.

In step 508, request responses are stored. In response to the data request, a vehicle system module provides system monitoring data such as, for example, operating parameters, diagnostic trouble codes, and failure logs or codes.

In step 509, vehicle data upload functions are configured. In an embodiment, a vehicle data upload includes configuration parameters for the VDU function in the vehicle. The VDU functions are updated at anytime after the configuration data is received. In one embodiment, the VDU is configured after each VDU event.

In step 510, the service center communication is terminated. In one embodiment, the vehicle telematics unit 120, 230 disconnects the call. In another embodiment, the service center terminates the connection.

In step 511, a database is marked with a task complete and a next task is indexed. One or more records of a database entry 300 for the vehicle are updated to reflect that scheduled bus requests and other data and services were communicated to the vehicle. A counter is indexed and the next database vehicle entry is accessed. The process then returns to step 502 and commences for a new vehicle having a test fleet identifier associated with the database entry.

In one embodiment, process 500 continues until each vehicle record in the database is updated. In another embodiment, process 500 continues until terminated by another process or by a user request.

Figure 6:
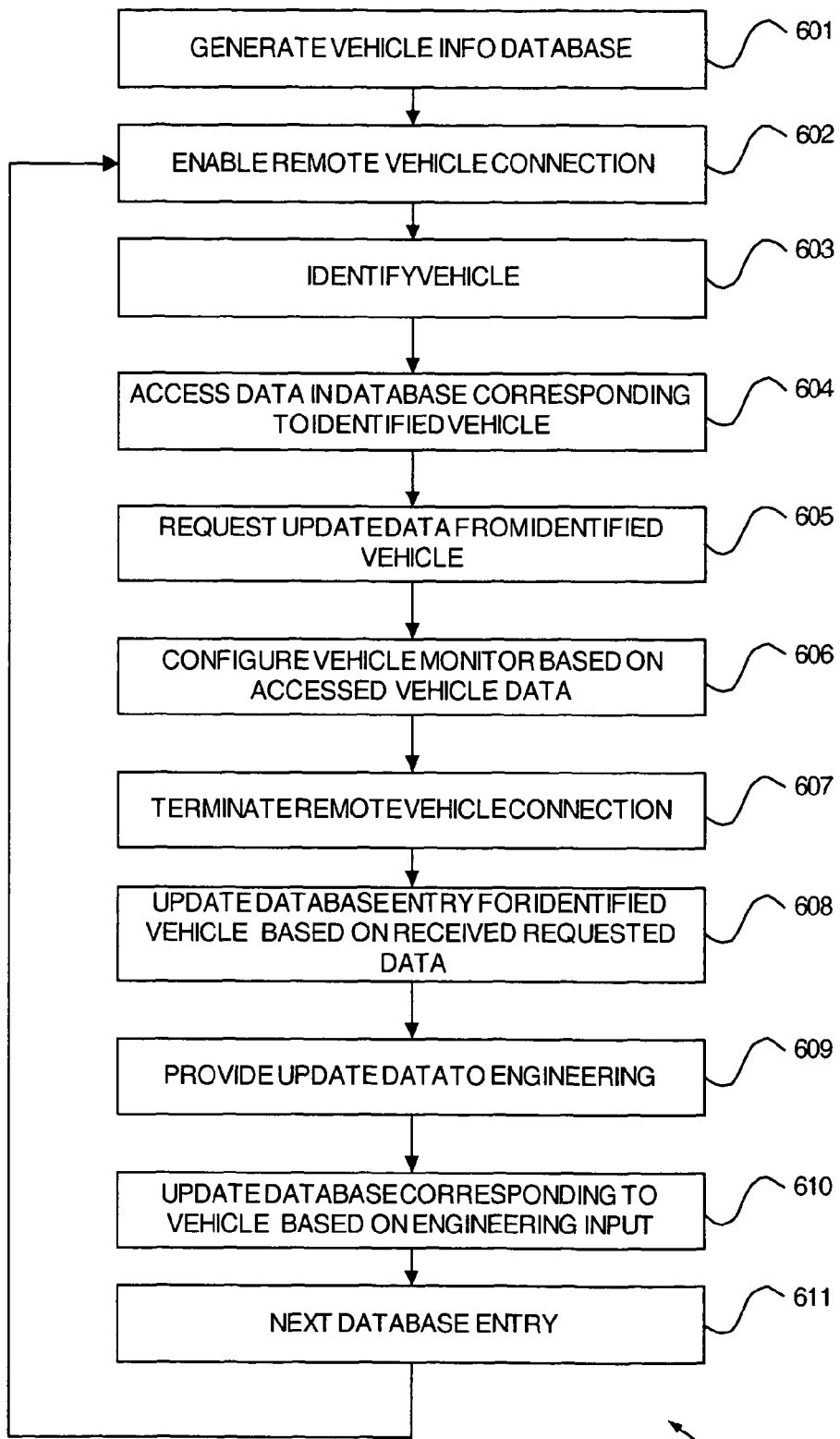
FIG. 6 is a process flow diagram of a method for managing captured test fleet data in accordance with an embodiment of the present invention.

FIG. 6 is a process flow diagram of a method for managing captured test fleet data in accordance with an embodiment of the present invention. In an embodiment, a captured test fleet vehicle communication system 100 is employed to implement process 600. Process 600 begins in step 601.

In step 601, a vehicle information database is generated. In an embodiment, the information database comprises a relational database of vehicle entries corresponding to vehicles of a captured test fleet. Each vehicle entry is associated with a vehicle having a captured fleet identifier, and contains one or more records of vehicle data such as information and scheduled requests. In an embodiment, the vehicle database is a captured test fleet database as described with reference to FIGS. 1-3. In an embodiment, the vehicle database is generated in response to a request from a client that desires a specific type of vehicle data to facilitate vehicle design, development, engineering or manufacturing processes.

In step 602, remote vehicle communication is enabled. A vehicle telematics device is operated within a service provider network to enable remote vehicle communications.

In step 603, a vehicle is identified. The vehicle is identified with a captured test fleet identifier such as, for example, a vehicle identification number (VIN). In another embodiment, a test fleet identifier is an electronic serial number (ESN) of a vehicle telematics unit 120, 230, a station identification (STID) number of a telematics unit 120, 230, or a mobile identification number (MIN) assigned to a telematics unit 120, 230.

In step 604, vehicle data in a database is accessed corresponding to the identified vehicle. The vehicle data is accessed at any time after the vehicle is identified. In an embodiment, accessed data includes data requests and vehicle data upload configuration data.

In step 605, data from the identified vehicle is requested. In an embodiment, a data request includes scheduled bus requests and system information such as, for example, diagnostic trouble codes. In another embodiment, the data is requested through a vehicle data upload (VDU) operation. In another embodiment, the requested vehicle data is provided to a service provider in response to the data request.

In step 606, a vehicle monitor is configured. A telematics unit 120, 230 in a vehicle receiving the data request or a vehicle data upload configures one or more vehicle system monitors to collect the requested data. In an embodiment, collected vehicle system data is provided to a service provider in response to the data collecting.

In step 607, the vehicle connection is terminated. In one embodiment, the vehicle telematics unit 120, 230 disconnects the call. In another embodiment, the service center terminates the connection.

In step 608, an entry for the identified vehicle is updated. In an embodiment, data received from the identified vehicle in response to the data request is updated in a record. In another embodiment, a record of an interaction with a test vehicle is recorded, such as for example, a record of a VDU event to the vehicle.

In step 609, updated vehicle data is provided to engineering. An engineering client is provided with data from vehicle entries and records of test fleet database for analysis and interactive design refinement, vehicle development or manufacturing processes.

In step 610, the database is updated based on engineering input. In an embodiment, an engineering client provides updated vehicle entries after analysis of various vehicle data records. In one embodiment, the updated entries describe new vehicle system monitoring configurations to implement monitoring of specific vehicle systems and parameters.

In step 611, the next database entry is indexed. After the vehicle entry is updated, the database indexes to the next vehicle entry in the database and process 600 returns to step 602 to update the data entry for the new vehicle entry. In an embodiment, the indexing is sequential. In another embodiment, the indexing is based on the type of data that has been provided by the engineering client. In an example, an engineering client wishes to perform a survey of all vehicle systems of a particular model of vehicle in the captured test fleet. The index is then associated with the database entries for each vehicle of the particular vehicle model under review. In one embodiment, process 600 continues until each vehicle record in the database is updated. In another embodiment, process 600 continues until terminated by another process or by a user or client request.

Figure 7:
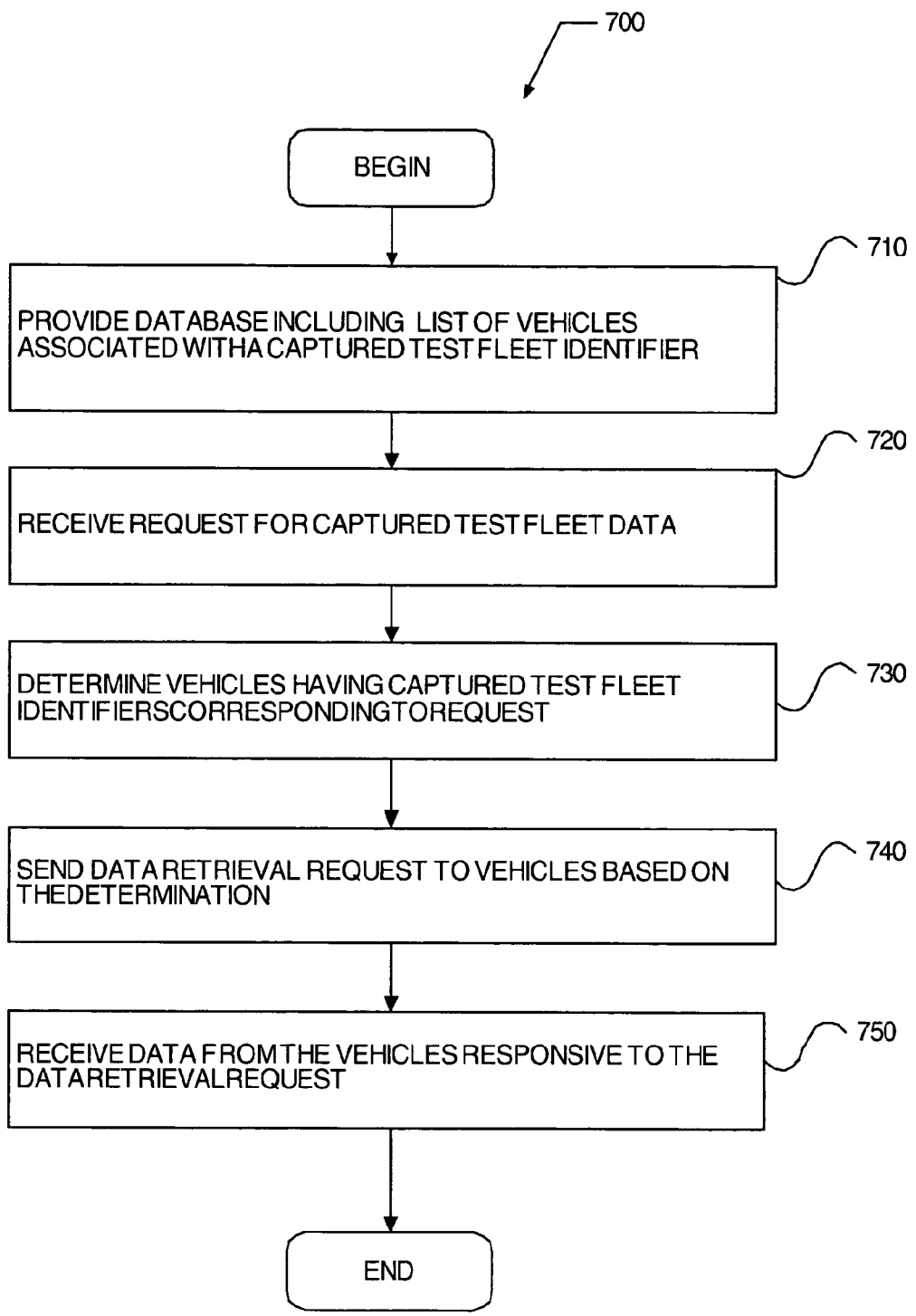
FIG. 7 is a process flow diagram of a method of obtaining captured test fleet data for vehicle design in accordance with an embodiment of the present invention.

FIG. 7 is a process flow diagram of a method of obtaining captured test fleet data for vehicle design in accordance with an embodiment of the present invention. In an embodiment, a captured test fleet vehicle communication system 100 is employed to implement the method of process 700. Process 700 begins in step 710.

In step 710, a database is provided including a list of vehicles associated with a captured test fleet. In an embodiment, the database is provided by a client or a telematics service provider. In one embodiment, the database is generated by a service provider server computer based on one or more test fleet identifiers that are associated with one or more captured test fleet vehicles.

In step 720, a request for captured test fleet data is received. The request for captured test data occurs any time after the database is provided. In an embodiment, the request for captured test fleet data is received from a client. In another embodiment, the request for captured test fleet data is received from a vehicle design center.

In step 730, vehicles having test fleet identifiers corresponding to the request are determined. In an embodiment, a test fleet identifier is a vehicle identification number (VIN). In another embodiment, a test fleet identifier is an electronic serial number (ESN) of a vehicle telematics unit 120, 230, a system identification (SID) number of a telematics unit 120, 230, or a mobile identification number (MIN) assigned to a telematics unit 120, 230. In yet another embodiment, the test fleet identifier is vehicle model data. In an embodiment, determining vehicles having captured test fleet identifiers corresponding to the request includes searching the database and identifying each vehicle data entry from the vehicle list having a captured test fleet identifier associated with the requested captured test fleet data.

In step 740, a data retrieval request is sent to vehicles based on the vehicle determination. A captured test vehicle system 100 is implemented to provide communication between a vehicle and the database. A vehicle telematics device is operated within a service provider network to enable remote vehicle communications. In another embodiment, a data retrieval request includes scheduled bus requests and system information such as, for example, diagnostic trouble codes. In another embodiment, the data is requested from a vehicle through a vehicle data upload (VDU) operation. In another embodiment, the requested vehicle data is provided to a service provider in response to the data request.

In step 750, data is received from the vehicles responsive to the data retrieval request. In an embodiment, the service provider system provides communication between a vehicle and the database. The data is received at any time after the data request is sent to the vehicle. In one embodiment, the captured vehicle test system is configured to provide a continuous data transfer between the vehicle and the database. In another embodiment, the captured vehicle test system is configured to provide a discrete data transfer between the vehicle and the database at regular intervals.

An embodiment further includes associating the received data with an entry in the database based on the test fleet identifier of the vehicle corresponding to the request and storing the received data to the database entry.

Another embodiment further includes providing the data stored to the database to a vehicle design center responsive to the request for captured test fleet data.

In an embodiment, the captured test fleet data is selected from the group consisting of diagnostic trouble codes, vehicle readiness flags, odometer readings, enrollment data, environmental data such as temperature and humidity, current vehicle location, vehicle system operating parameters and history codes. In one embodiment, process 700 terminates after data is received in step 750. In another embodiment, process 700 returns to step 720 (not shown) and continues until another process or a user request terminates the process.

Figure 8:
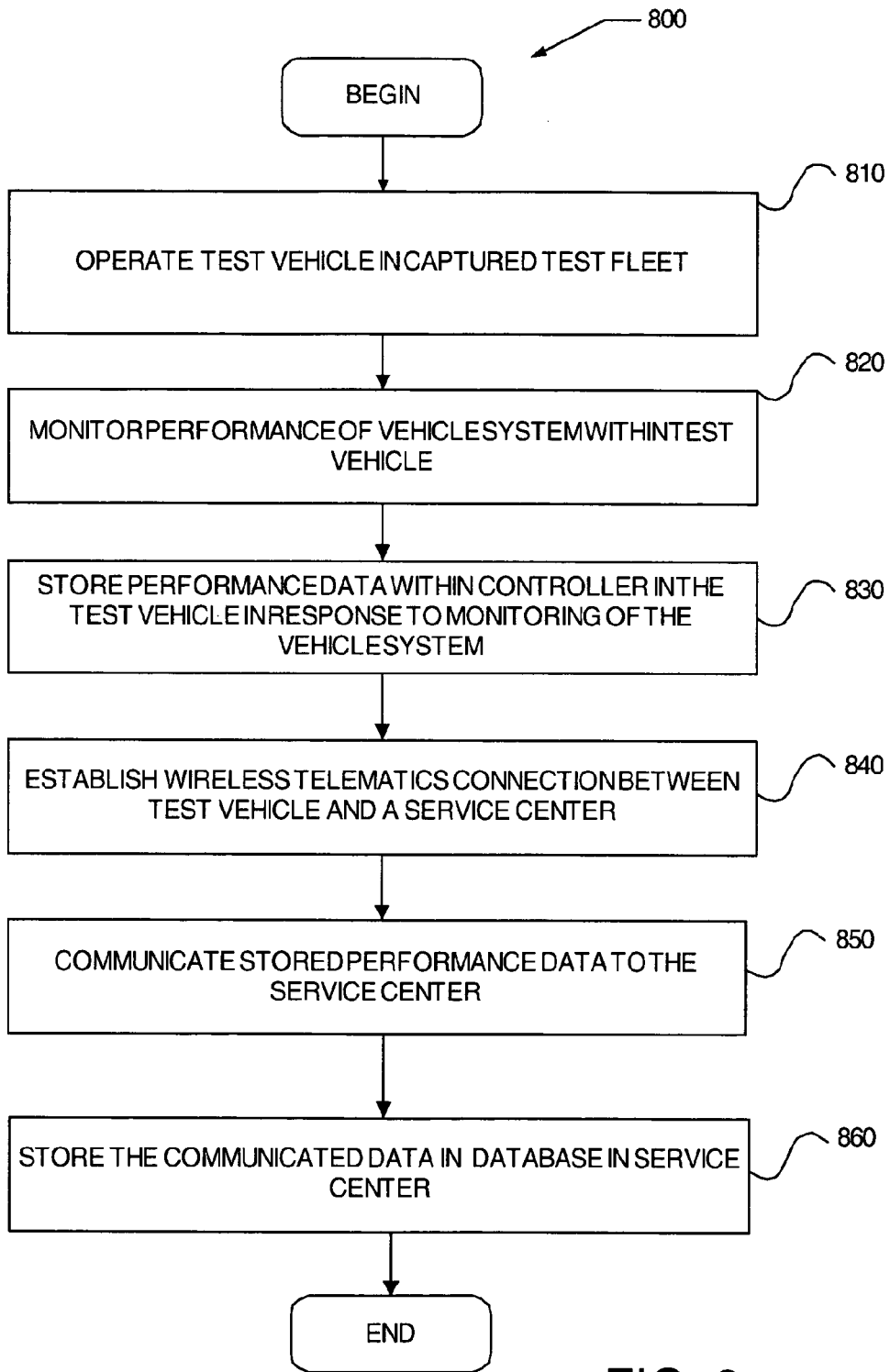
FIG. 8 is a process flow diagram of a method for real-time wireless interactive test vehicle data collection in accordance with an embodiment of the present invention.

FIG. 8 is a process flow diagram of a method for real-time wireless interactive test vehicle data collection in accordance with an embodiment of the present invention. In an embodiment, a captured test fleet system 100 and a captured test fleet vehicle design operating environment 200 are employed to implement process 800. Process 800 begins in step 810.

In step 810, a test vehicle is operated in a captured test fleet. The captured test fleet includes a plurality of test vehicles of similar and different vehicle models that are enabled to communicate with a service center to allow real-time and cached field monitoring of vehicle design and operational parameters in the test vehicles. The captured test fleet system is configurable for operation with any number of test vehicles depending on the data desired and the purpose of the data collection, such as for development, design and manufacturing exercises.

In step 820, the performance of a vehicle system within the test vehicle is monitored. A vehicle system module 220 such as, for example, a powertrain control module is configured to monitor various operating parameters and conditions during vehicle operation. In one embodiment, the system monitoring occurs at any time that a controller is enabled to receive data. In another embodiment, a schedule of communication bus requests is stored to a vehicle during a vehicle data upload (VDU). The schedule controls when and what is monitored by the vehicle system modules 220.

In step 830, vehicle system performance data is stored within a controller in the test vehicle. In an embodiment, a vehicle telematics unit 120, 230 provides a controller or equivalent processor and controller functions to direct the storing of the performance data. In an embodiment, to alleviate consumption of valuable vehicle system module 220 memory resources, the telematics unit 120, 230 is configured to periodically transfer any collected data from each vehicle system module 220.

In step 840, a wireless telematics connection is established between the test vehicle and a service center. In one embodiment, a service provider provides the telematics connection. In one embodiment, a vehicle telematics unit 120, 230 establishes the telematics connection. In another embodiment, a service provider establishes the telematics connection. In an embodiment, triggers stored in the vehicle telematics device invoke a wireless connection with a service provider.

In step 850, the stored performance data is communicated to the service center. In one embodiment, all vehicle system module 220 data that is stored in the telematics device memory is transferred to a service provider. The stored performance data are communicated at any time after the data is stored within a controller.

In step 860, the received performance data is stored to a database in the service center. In one embodiment, all captured test fleet vehicle data received from test fleet vehicles is stored to a test vehicle relational database. The database contains entries for each captured test vehicle of the fleet. Each vehicle entry is associated with a specific test vehicle having a captured fleet identifier, and contains one or more records of test vehicle data such as information and scheduled requests. In an embodiment, the vehicle database is a captured test fleet database as described with reference to FIGS. 1-3. In another embodiment, the vehicle database is generated in response to a request from a client that desires a specific type of vehicle data to facilitate vehicle design, development, engineering or manufacturing processes.

An embodiment further includes requesting performance data for a vehicle system from a test vehicle wherein the request is initiated from the service center.

Another embodiment further includes determining a trigger in the telematics device wherein the wireless telematics device establishes a wireless telematics connection between the test vehicle and a service center to communicate the performance data to the service center responsive to the trigger determination.

Yet another embodiment further includes requesting performance data for a vehicle system from a test vehicle where the request is initiated from a vehicle design center via the service center.

Still another embodiment further includes providing the performance data stored to the database to a vehicle design center. And yet another embodiment further includes analyzing the obtained data at the vehicle design center, identifying a modification to the designed vehicle to improve the designed vehicle based on the obtained data and providing new vehicle design data based on the identified modification.

Use of a mobile telephone network allows data to be uploaded to the call center from the telematics unit at any desirable time and from any place where the vehicle is located. In the event that the vehicle is not in operation when the call center desires to upload data, the telematics unit is programmed to upload data upon operation. Thus, in one embodiment, the telematics unit is programmed to call the call center upon beginning operation if the data upload request arrives while the vehicle is not in operation.

Figure 9:
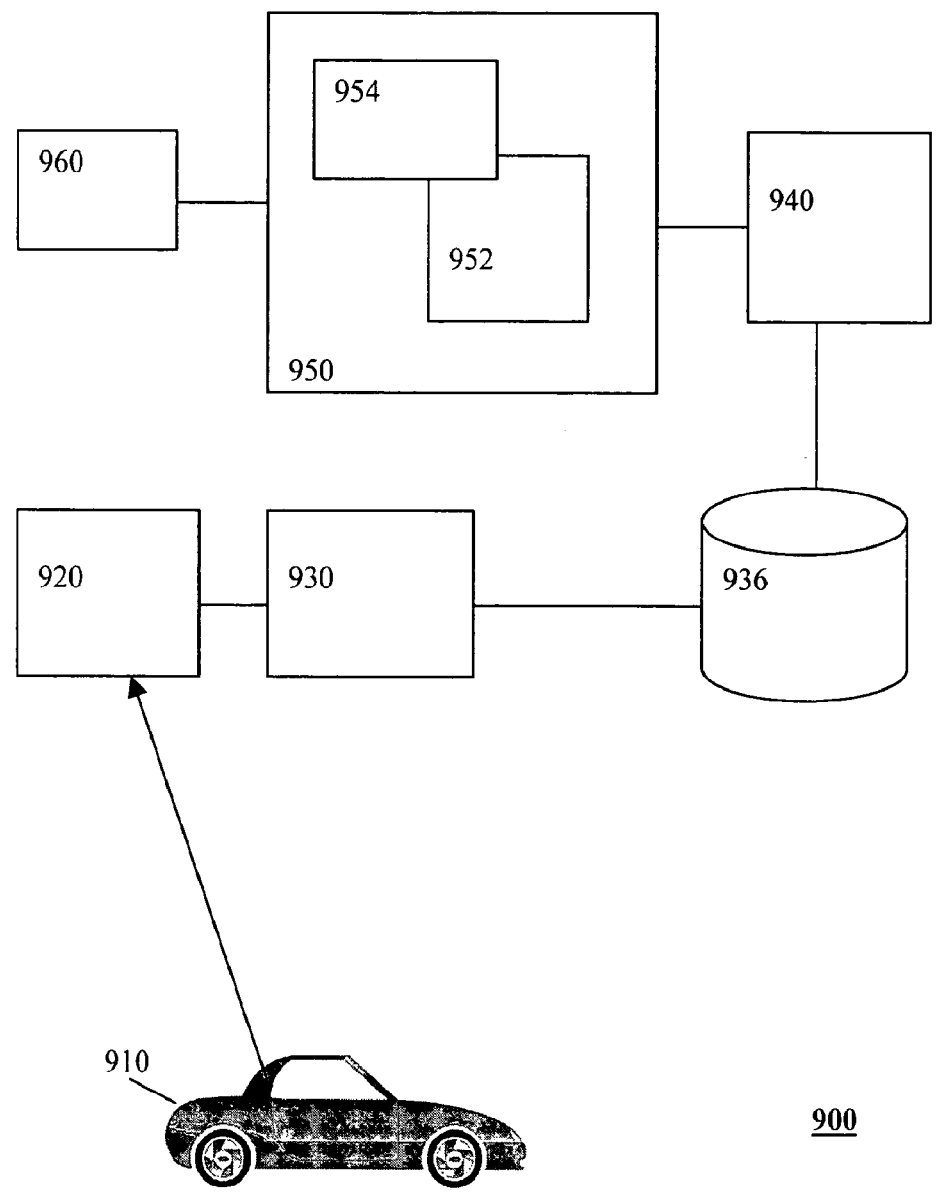
FIG. 9 is a block diagram of an illustrative operating environment for web-enabled configurable quality data collection tool in accordance with an embodiment of the present invention.

FIG. 9 is a block diagram of an illustrative operating environment for a web-enabled configurable quality data collection tool in accordance with an embodiment of the present invention. In an embodiment, a captured test fleet vehicle communication system 100 is employed to implement the web-enabled operating environment 900.

Web-enabled operating environment 900 includes a test vehicle 910, having test vehicle data collection components 920, and test vehicle communication components 930 which facilitate communication with one or more databases 936. Database 936 is in communication with vehicle data access web service 940, which communicates with a client 960 via a web portal framework 950.

Test vehicle 910 is any vehicle, such as for example, a pilot, test, or production vehicle that is operated within a captured test fleet of vehicles enabled for test fleet data communication through a telematics service provider. Test vehicle 910 is, for example, test vehicle 210 discussed with reference to FIG. 2, or any test vehicle configurable for data collection as described in this example. The web-enabled operating environment 900 is configurable for operation with any number of test vehicles based on the data desired and the purpose of data collection.

Vehicle data collection component 920 is any component of test vehicle 910 that is configured to monitor a system or part of test vehicle 910. Vehicle data collection component 920 receives data communications and instructions from other devices, such as vehicle communication component 930. Vehicle data collection component monitors and collects data from test vehicle 910. Vehicle data collection component 920 includes, for example vehicle system module 220 as discussed with reference to FIG. 2, or any component that collects data information about test vehicle 910.

Vehicle data collection component 920 sends and receives communications and instructions through the vehicle communication component 930. Vehicle communication component 930 is any component that facilitates communication between the test vehicle 910 and a remote node. In one embodiment, vehicle communication component 930 includes a telematics unit 230 as discussed with reference to FIG. 2.

The test vehicle 910 is in communication with database 936 via vehicle data communication component 930. Database 936 is any database for storing test vehicle fleet data. Database 936 includes one or more captured test vehicle data entries corresponding to test vehicles operated in a captured test vehicle system. In one embodiment, database 936 is a relational database having unique data entries for each test vehicle operated within a captured test fleet. Each test vehicle is associated with a vehicle identifier in the database, which defines and associates the test vehicle as part of a captured test fleet. In one embodiment, a test vehicle identifier is a vehicle identification number (VIN). In another embodiment, a vehicle identifier is an electronic serial number (ESN) of a telematics device, a system identification number (SID) of a telematics device, or mobile identification number (MIN) assigned to a telematics device. In another embodiment, vehicle identifier is any characteristic that describes test vehicle attributes such as make, model, odometer mileage, module identification, or the like. Database 936 is, for example, database 276 as discussed with reference to FIG. 2, or any other database configured to store test vehicle data and provide the services described in this example. In one embodiment, database 936 receives test vehicle data and sends data to test vehicle 910 via vehicle communication component 930.

Database 936 is in communication with a web portal framework 950 via a vehicle data access web service 940. Vehicle data access web service 940 facilitates the communication and transmission of test vehicle data from database 936 to the Internet. In one embodiment, vehicle data access web service 940 is a web portal such as web-hosting portal 160 as discussed with reference to FIG. 1. Database 936 is in direct communication with the web portal framework 950. In another embodiment, vehicle data access web service 940 is a call center, such as for example call center 170, which receives and sends information to database 936. In an embodiment, the call center receives and filters data from database 936 and forwards the filtered data to the web portal framework 950.

Web portal framework 950 includes one or more vehicle data portlets 952 and a vehicle data collection configuration portlet 954. Web portal framework 950 provides test vehicle data and parameters to a client 960 and allows client 960 to request data from test vehicle 910. Web portal framework 950 is in direct communication with the Internet and vehicle data access web service 940. One or more vehicle data portlets 952 receive test vehicle data from database 936 via vehicle data access web service 940. Vehicle data portlet 952 provides vehicle data to a client 960 via the structure of web portal framework 950. Vehicle data collection configuration portlet 954 receives data from one or more vehicle data portlets 952 and receives requests from a client 960 to acquire further or different data from test vehicle 910. Client 960 interacts with vehicle data collection configuration portlet 954 via web portal framework 950.

A client 960 is any entity or computing device that interacts with web portal framework 950 such as a vehicle design center, an engineering team, a production group, or a single user. In one embodiment, the client is a user or group of users that access test vehicle data through web portal framework, such as, for example, quality assurance client 240, design client 250, or production client 260 as discussed with reference to FIG. 1.

Client 960 executes Internet browser and Internet-access computer programs for sending and receiving data over the Internet to access web portal framework 950. In one embodiment, the client 960 accesses web portal framework 950 to change vehicle data collection parameters via vehicle data collection configuration portlet 954 or to view collected test vehicle data via vehicle data portlet 952. In one embodiment, the data sent by client 960 through vehicle data collection configuration portlet 952 includes directives to change certain programming and operational modes of electronic and mechanical systems within test vehicle 910. In another embodiment, the data includes directives to send certain data such as operational modes of electronic and mechanical systems within test vehicle 910.

Figure 10:
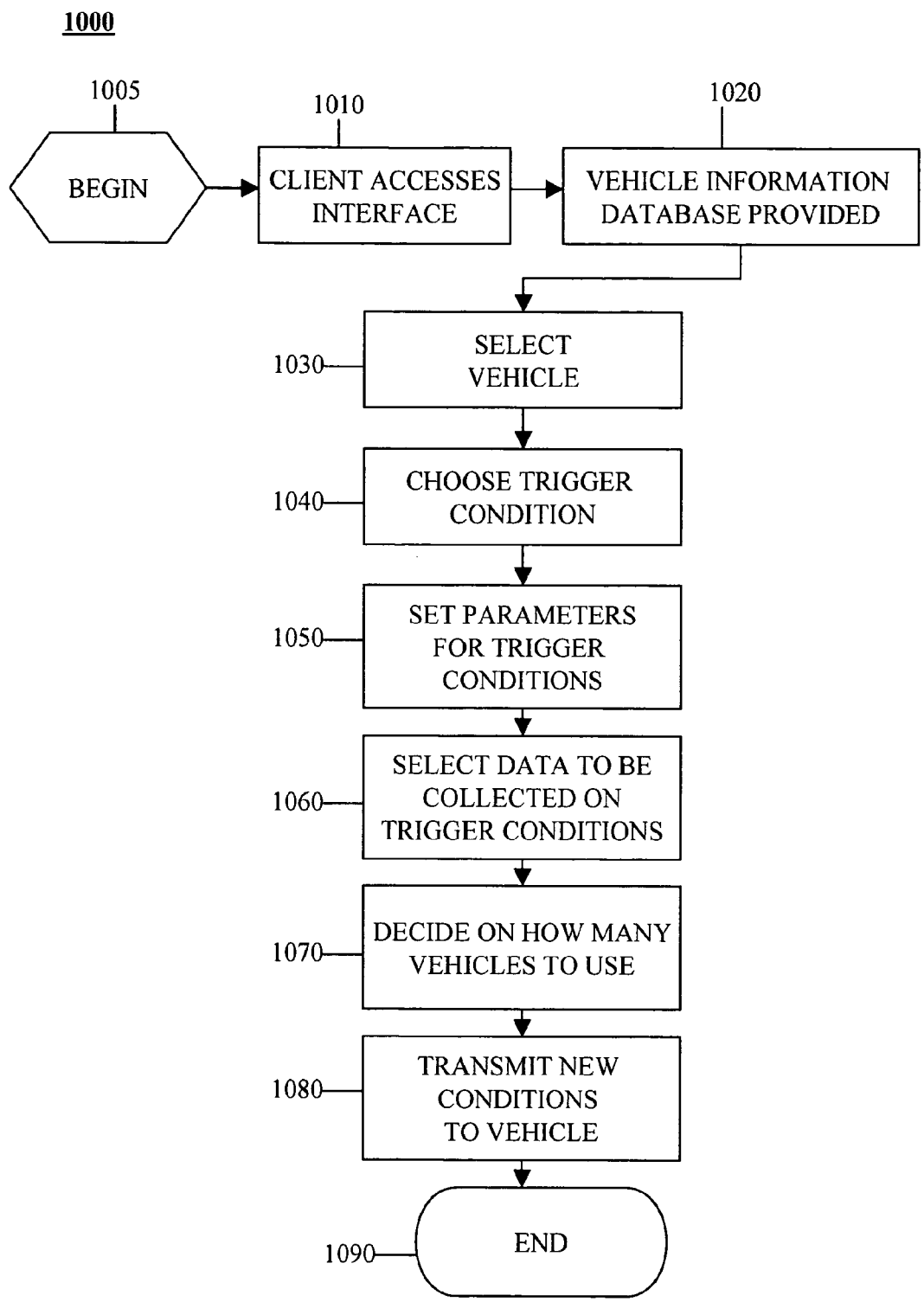
FIG. 10 is a process flow diagram of a method for remote configuration of test vehicle data capture in accordance with an embodiment of the present invention.

FIG. 10 is a process flow diagram of a method for remote configuration of test vehicle data capture in accordance with an embodiment of the present invention. In an embodiment, a captured test fleet system 100 and a captured test fleet vehicle design operating environment 200 are employed to implement process 1000. Process 1000 involves a test vehicle, which is configured to automatically provide vehicle system data to a service center based on specific trigger events. The process begins at step 1005.

At step 1010, a client accesses an interface at a remote station. A client is any entity or computing device that interacts with captured test vehicle data, such as a vehicle design center, an engineering team, a manufacturing production group, or a single user where a client 150 such as described with reference to FIG. 1 is used to facilitate receiving and processing the captured test fleet data. In an embodiment, the interface is a web-portal, a service center 270, or another data communication regime. The client accesses the interface and sends a request for a vehicle database.

At step 1020 a vehicle information database is provided to the client at the interface. In an embodiment, the vehicle information database comprises a database of vehicle entries corresponding to vehicles of a captured test fleet such as described with reference to FIG. 3. Each vehicle entry in the database is associated with a vehicle captured fleet identifier. In one embodiment, a test fleet identifier is a vehicle identification number (VIN). In another embodiment, a test fleet identifier is an electronic serial number (ESN) of a telematics device, a system identification (SID) number of a telematics device, or mobile identification number (MIN) assigned to a telematics device. In an embodiment, the vehicle information database includes relational associations to provide correlated captured test fleet data for statistical analysis, such as similar vehicle system information. In another embodiment, vehicles are identified and grouped together by make, model, year, similar odometer mileage, oil life, or other relevant characteristics. In an embodiment, these characteristics act as test vehicle identifiers.

The database stores triggers for data collection for each test vehicle. In one embodiment, triggers are threshold conditions or events at the occurrence of which data about an associated test vehicle is collected at the test vehicle. In one embodiment, a client can create new trigger conditions to be stored in the database. In one embodiment, a client has the ability to create and eliminate triggers and parameter retrieval definitions. In an embodiment, the types of triggers are standardized to be the same for all vehicles in a captured test fleet. In another embodiment, triggers are created separately for each different vehicle or group of vehicles in a captured test fleet.

At step 1030 the client selects one or more vehicles in the captured test fleet from the generated database. The client selects the vehicles based on their vehicle identifiers. In an embodiment, the client selects the test vehicle to configure data collection on the vehicle. The vehicle can be selected based on any of its associated vehicle identifier information such as its VIN, ESN, MIN, SIN, make, model, odometer reading, or other relevant characteristics. In another embodiment, the client selects a vehicle based on past occurrences of specific trigger events. In another embodiment, the client selects a vehicle for troubleshooting based on a diagnostic trouble code (DTC) occurrence. In yet another embodiment, the client selects a group of vehicles having similar vehicle identifier information. For example, the client selects a group of associated vehicles having the same make and model.

At step 1040 the client configures the vehicle for data collection and associates trigger conditions with the selected vehicle. In an embodiment, the client associates one or more trigger conditions with the selected vehicle or group of vehicles. The selected trigger condition is associated with each test vehicle having the selected vehicle identifier. The trigger condition is any event upon which a collection of data from the test vehicle is specified. At the occurrence of the trigger condition the selected vehicle collects specified data to be stored at the vehicle for future upload, or sent via a wireless connection to a remote center.

In one embodiment, trigger conditions include but are not limited to: number of ignition cycles, oil life, odometer readings, specific time and date, expired amount of time, GPS location, a user initiated call request, and the like. In one embodiment, the client can select a trigger condition to be associated with the selected vehicle identifier from a list of pre-set trigger conditions. In another embodiment, the client may create new trigger conditions or combination of trigger conditions. The client selects specific trigger conditions and activates and deactivates these selected trigger conditions for the associated vehicle identifier as needed through the interface.

At step 1050 the client sets parameters for the selected trigger condition on the associated test vehicle identifier. For example, a client can select for an odometer reading trigger condition to be triggered at the first one thousand miles. In another embodiment, the client can change the parameters of the trigger condition as needed. For example, a client can select for an odometer reading trigger condition to be triggered at a specific reading of the client's specification such as for example every five hundred miles, or every one hundred miles after the initial trigger event. In one embodiment, there is one parameter for the trigger condition.

The trigger condition is a uniquely occurring event in the test vehicle such as the first one thousand miles traveled, or a repetitive event, such as every one hundred miles traveled. In another embodiment, the parameters on the trigger conditions involve an initial threshold trigger parameter and a post-threshold trigger parameter. An initial threshold trigger condition is a trigger condition that occurs once at the selected test vehicle. A post-threshold condition is a trigger condition that occurs after an initial trigger condition has occurred at the selected test vehicle.

At step 1060 the client selects the type of vehicle data parameters to be collected at the occurrence of the trigger condition at the test vehicle. The client associates the type of vehicle data parameters to be collected with the selected vehicle or group of vehicles based on the selected vehicles' vehicle identifier. Types of vehicle data parameters can be selected from any information that can be gathered about the test vehicle. In one embodiment, the client selects the type of vehicle data parameters to be collected from pre-available data types. A list or a group of vehicle data types that can be collected at the vehicle is made available to the client for selection. In another embodiment, the client creates a new vehicle data parameter type to be collected at the occurrence of the trigger condition. In an embodiment, the client chooses all data parameters to be collected at the trigger condition from pre-available vehicle data parameter types and newly created vehicle data parameter types.

At step 1070 the client chooses how to apply the created trigger condition configuration. In an embodiment, the client can select between applying the created trigger condition configuration to a single test vehicle, a group of test vehicles, or to save the selected configuration for further use. The client selects the test vehicles to apply the created trigger condition configuration based on the vehicles' associated vehicle identifiers. The client establishes the trigger condition and the associated vehicle data type to be collected for the selected vehicle identifier. In an embodiment, the configuration is saved as a template for an individual test vehicle, a group of test vehicles, or for an entire captured test fleet. The newly created trigger condition configuration is saved for further use.

At step 1080 the new data capture configuration is transmitted and stored at the at least one test vehicle as described with reference to FIGS. 1-3 and FIGS. 6-8.

The method stops at step 1090.

Figure 11:
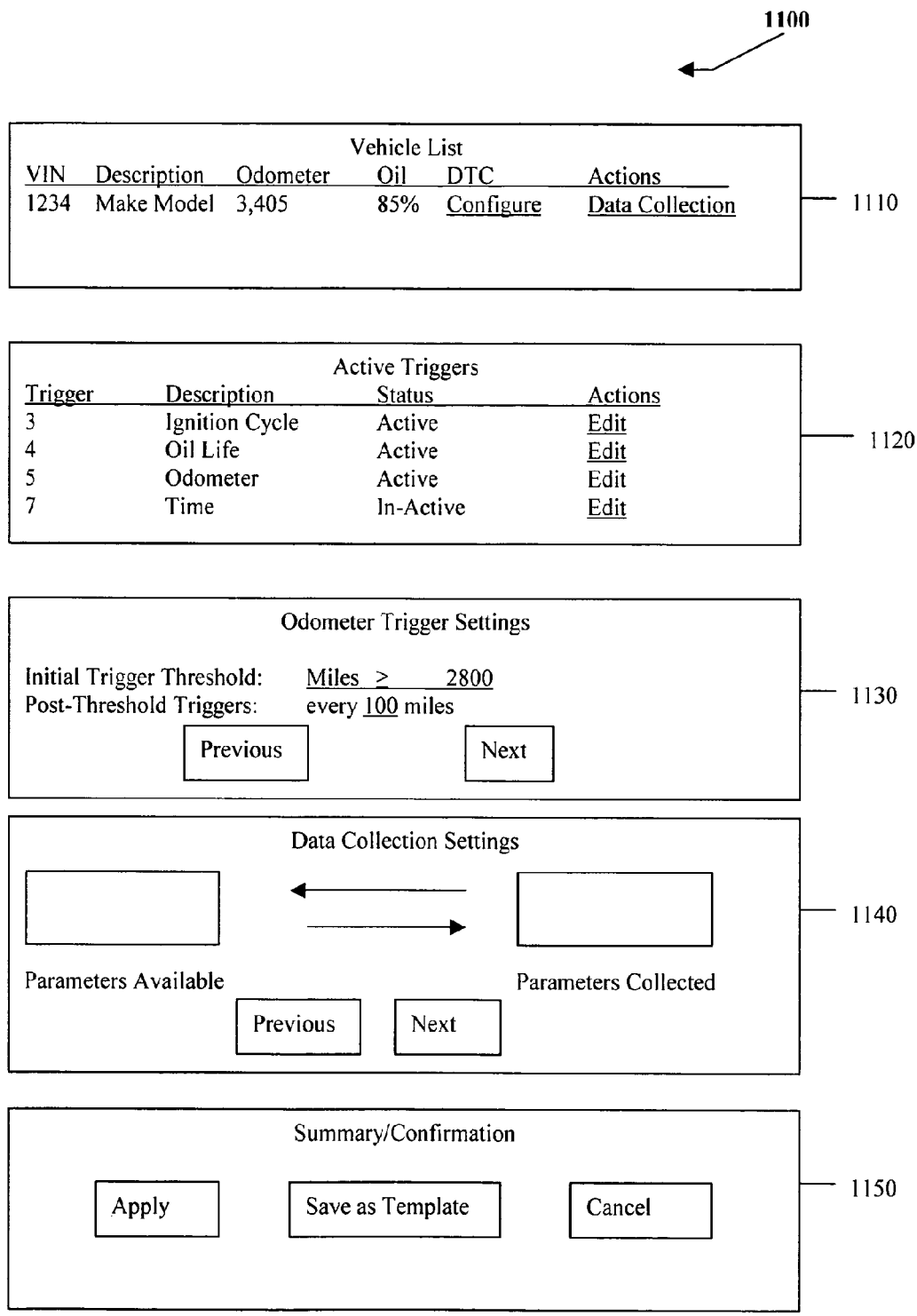
FIG. 11 is an example of a web-enabled client interface for data capture configuration for a test vehicle in a captured vehicle fleet in accordance with an embodiment of the present invention.

FIG. 11 is an example of a web-enabled client interface for data capture configuration for a test vehicle in a captured vehicle fleet in accordance with an embodiment of the present invention.

Web interface 1100 is any set of interactive windows, frames, computer mediums, or web pages through which a client configures test vehicle data capture.

A client views and selects at least one list of test vehicles using vehicle list interface 1110. A list of vehicle identifier associated information is displayed on the vehicle list interface. A list of vehicle identifier associated information is displayed from a captured test fleet database such as database 276. In one embodiment, the associated vehicle identifiers include a vehicle identification number (VIN), a make and model of a vehicle, an odometer indicator reading, a percentage of oil life left before a next recommended oil change, and a diagnostic trouble code (DTC). In another embodiment, the list of associated information includes all available data parameters stored in a database about the test vehicles. The associated information is used as test vehicle associated identifiers. The vehicle list interface 1110 allows a client to change the type of data collected and the type of trigger events that initiate data collection on a test vehicle. In an embodiment, the client can access and view vehicle information associated with test vehicles in a captured test fleet.

Using active trigger interface 1120, a client views and selects which trigger conditions are activated for the selected test vehicle or group of vehicles. In one embodiment, triggers are threshold conditions or events at the occurrence of which data is collected about an associated test vehicle. In an embodiment, the types of triggers are standardized to be the same for all vehicles in a captured test fleet. In another embodiment, triggers are created separately for each different vehicle or group of vehicles in a captured test fleet. In another embodiment, the client creates new triggers to be associated with the vehicle identifiers. Trigger conditions include, but are not limited to number of ignition cycles, time and date, oil life, odometer readings, specific time, expired amount of time, a request for continuous operation, a user initiated call request, GPS location, and the like. The various trigger conditions can be set to be active or inactive based on the selection of a client. The selected trigger conditions are associated with the selected test vehicle identifier in the provided database. In one embodiment, each trigger is configured with an expiration event. An expiration event is any event to terminate the functioning of the trigger, such as, for example, a predetermined calendar date, a predetermined span of time following a first ignition cycle, a predetermined mileage, an occurrence of a first service visit, leaving or entering a predetermined geographical location as determined by GPS, a predetermined internal bus message, application of a predetermined number of braking cycles, a predetermined number of acceleration events, a predetermined number of applications of a door lock, a predetermined number of applications of a window event, application of a predetermined number of vehicle output events.

In another embodiment, each trigger is associated with at least one permission instruction. A permission instruction grants access to a specified person or group of people. In another embodiment, access to a trigger includes the ability to create, modify or terminate the trigger. In another embodiment, access to a trigger includes access to data and parameters collected by the trigger. In one embodiment, permission instructions are controlled with a password. In one embodiment, creation of the trigger results in ownership of the trigger including access and the ability to grant access to other specified persons.

Permission instructions apply to vehicle and vehicle configurations. For example, a user creates one or more triggers and assigns permissions to said triggers. For example, if a user creates a trigger for a specific vehicle, then the user assigns a permission value allowing other users to utilize the specific vehicle. The other users are able to use the existing triggers within the vehicle telematics unit, modify the existing triggers, or create new triggers, depending on the levels of permissions granted. Permissions may also apply to parameter retrieval definitions. Multiple users may access the same vehicle. In one embodiment, modifications to a trigger or parameter are associated with the user that made the modification so that a history is created.

The threshold of a specific trigger event is set using a trigger settings interface 1130. In an embodiment, a trigger settings interface 1130 is associated with each selected or newly created trigger. In one embodiment, each trigger threshold is individually controllable. In the embodiment shown, a client sets odometer trigger thresholds in the trigger settings interface 1130. In one embodiment, an initial trigger threshold and a post-threshold trigger can be set in the trigger settings interface 1130. An initial trigger threshold is a first occurring trigger condition such as when a test vehicle's odometer first indicates a set distance. A post-threshold trigger is any condition occurring after the initial trigger condition and which is predicted to occur at least once after the initial trigger condition has occurred. The client selects and establishes thresholds for selected trigger conditions. The thresholds for the trigger conditions determine when the trigger condition occurs, and are associated with the selected test vehicles' identifiers. In an embodiment, the client selects the trigger thresholds for each selected trigger condition to be associated with the selected vehicle identifiers.

A client selects the type of data that is collected from an at least one test vehicle at the occurrence of a trigger event at a data collection settings interface 1140. Types of data parameters collected are selected from any information that can be gathered about the at least one test vehicle. The data parameters that the client sets to be collected are associated with the selected test vehicle identifier. In one embodiment, the client selects the type of data to be collected from a list of preset available vehicle data parameters. In another embodiment, the client creates new data parameters to be collected at the at least one test vehicle at the occurrence of a specific trigger event. In another embodiment, the client selects vehicle data parameters for collection from preset available data parameters and newly created data parameters. In an embodiment, data collection settings interface 1140 specifies the type of data and the exact vehicle data parameter collected at the occurrence of a specific trigger event. The selected vehicle data parameters to be collected at the occurrence of the associated trigger condition are associated with an at least one selected test vehicle identifier.

Any activated or in-activated trigger conditions and any modified trigger condition settings that were changed or set in interfaces 1120, 1130, or 1140 are confirmed using a confirmation interface 1150. In one embodiment, confirmation interface 1150 displays a summary of the changes made by the client in interfaces 1120, 1130, and 1140. The client then confirms or rejects the changes. In another embodiment, the client confirms each change separately. In another embodiment, the client confirms all changes made in interfaces 1120, 1130, or 1140 at the same time.

The client chooses how to apply the created trigger condition configuration. In one embodiment, the client applies the created trigger condition configuration to only one test vehicle. In another embodiment, the client saves the configuration as a template to be applied to a group of test vehicles, or to an entire captured test fleet. The created trigger condition configuration is associated with the selected test vehicles' vehicle identifiers. The new configuration is saved at the confirmation interface 1150. In one embodiment, the new trigger configuration is stored for further use. In another embodiment, the new trigger configuration is transmitted and stored at the at least one test vehicle as described with reference to FIGS. 1-3 and FIGS. 6-8.

In one embodiment, the web-enabled client interface for data capture configuration is implemented using the Java computer language. In another embodiment, the web-enabled client interface is implemented in a hardware-neutral computer language. In one embodiment, the web-enabled client interface for data capture configuration is implemented using C#. In another embodiment, the application for the web-enabled client interface is a stand-alone application. In yet another embodiment, the web-enabled client interface is configured to provide direct access to the controls for vehicle triggers and data collection.

It is anticipated that the invention will be embodied in other specific forms not described that do not depart from its spirit or essential characteristics. The described embodiments are to be considered in all respects only as illustrative and not restrictive.

We claim:

1. A data-collection tool for configuring a telematics-equipped vehicle to collect vehicle data remotely via wireless communication with a telematics unit of the vehicle, comprising:
    a client computer having stored thereon a client interface program, wherein upon execution by the client computer, the client interface program provides:
        a vehicle list interface through which a user can select one or more vehicles for configuration;
        a trigger interface that provides access to defined triggers that can be set on the vehicle, wherein each trigger is associated with one or more trigger conditions and one or more data items such that upon occurrence of the trigger condition, the one or more data items are obtained and transmitted from the vehicle;
        a trigger settings interface that enables configuration of the one or more trigger conditions for a particular one of the triggers; and
        a data collection settings interface that enables selection of the one or more data items to be obtained upon occurrence of a particular one of the triggers.

2. A data collection tool as defined in claim 1, wherein the trigger interface enables creation of new triggers or selection of existing triggers.

3. A data collection tool as defined in claim 1, wherein the client interface program enables configuration of permissions instructions for one or more of the triggers so that access to defined triggers can be restricted to certain individuals or groups of individuals.

4. A data collection tool as defined in claim 1, wherein the data collections settings interface provides a list of pre-available vehicle data parameters.

5. A data-collection system for configuring a telematics-equipped vehicle to collect vehicle data remotely via wireless communication with a telematics unit of the vehicle, comprising:
    a vehicle having an installed telematics unit;
    a central facility that communicates with the telematics unit via a wireless carrier system; and
    a client interface that enables configuration of data collection, said client interface providing a number of different user input screens that together enable configuration of triggers, the user input screens including a first screen for identification of one or more vehicles to receive a trigger, a second screen that enables selection and configuration of one or more triggers, and at least one additional screen that enables configuration of trigger conditions and data items for a particular trigger, such that a configured trigger includes at least one trigger condition and at least one associated data item;
    wherein the configured trigger is downloaded to the vehicle and, upon occurrence of the trigger condition, the data items are collected at the vehicle and uploaded from the telematics unit to a central facility.

6. A data collection system as defined in claim 5, wherein the at least one additional screen includes a third user input screen that enables configuration of trigger conditions for a specified trigger, and a fourth user input screen that enables selection of one or more data items to be associated with the specified trigger.

7. A data collection system as defined in claim 5, wherein the client interface includes a screen that enables a configured trigger to be applied to a vehicle or group of vehicles, or saved as a defined trigger for subsequent use.

* * * * *